United States Patent
Krishnamoorthy et al.

(10) Patent No.: US 9,107,117 B2
(45) Date of Patent: Aug. 11, 2015

(54) COLLISION ELIMINATION THROUGH FORCED RESELECTION OF CELLS IN MULTI-SIM MOBILE DEVICES

(71) Applicant: QUALCOMM Incorporated, San Diego, CA (US)

(72) Inventors: Parthasarathy Krishnamoorthy, Hyderabad (IN); Anand Rajurkar, Hyderabad (IN); Manjunatha Subbamma Ananda, Hyderabad (IN); Raghavendra Anand, Chickballapur (IN); Sanjeev Ramachandra Nimishakavi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/082,324

(22) Filed: Nov. 18, 2013

(65) Prior Publication Data
US 2015/0141017 A1    May 21, 2015

(51) Int. Cl.
| H04M 1/00 | (2006.01) |
| H04W 36/00 | (2009.01) |
| H04W 48/20 | (2009.01) |
| H04W 68/02 | (2009.01) |
| H04W 36/08 | (2009.01) |
| H04W 88/06 | (2009.01) |

(52) U.S. Cl.
CPC ...... *H04W 36/0066* (2013.01); *H04W 36/0072* (2013.01); *H04W 36/08* (2013.01); *H04W 48/20* (2013.01); *H04W 68/02* (2013.01); *H04W 88/06* (2013.01)

(58) Field of Classification Search
CPC ............ H04W 36/08; H04W 36/0072; H04W 36/0066; H04W 48/20; H04W 68/02
USPC .................. 455/552.1, 553.1, 550.1, 558, 437
See application file for complete search history.

(56) References Cited

U.S. PATENT DOCUMENTS

| 8,244,301 B2 | 8/2012 | Shi |
| 2003/0125073 A1 | 7/2003 | Tsai et al. |
| 2012/0231802 A1 | 9/2012 | Ngai |

(Continued)

FOREIGN PATENT DOCUMENTS

| CN | 101827464 A | 9/2010 |
| EP | 2466970 A1 | 6/2012 |

(Continued)

OTHER PUBLICATIONS

International Search Report and Written Opinion—PCT/US2014/065060—ISA/EPO—Feb. 18, 2015.

*Primary Examiner* — Khai M Nguyen
(74) *Attorney, Agent, or Firm* — The Malbury Law Group, PLLC

(57) ABSTRACT

The various embodiments provide methods for implementing a forced reselection strategy after causing colliding subscriptions to perform reselection to neighboring cells. In various embodiments, the MSMS communication device may undo the effects of forced reselection in certain situations when continuing to employ forced reselection may be ineffective. In other embodiments, the MSMS communication device may force reselecting subscriptions to reselect to neighboring cells in a paging group based on the page timings of the neighboring cells. Thus, the various embodiments may increase the performance of the colliding subscriptions and may enhance the user's overall experience.

48 Claims, 11 Drawing Sheets

(56) References Cited

U.S. PATENT DOCUMENTS

| | | | |
|---|---|---|---|
| 2012/0269173 A1 | 10/2012 | Chin et al. | |
| 2013/0176951 A1 | 7/2013 | Dhanda et al. | |
| 2013/0203461 A1* | 8/2013 | Li | 455/552.1 |
| 2013/0316718 A1* | 11/2013 | Hsu et al. | 455/450 |
| 2014/0128082 A1* | 5/2014 | Chirayil | 455/438 |
| 2014/0162661 A1* | 6/2014 | Shaw et al. | 455/439 |

FOREIGN PATENT DOCUMENTS

| | | |
|---|---|---|
| WO | 2012109830 A1 | 8/2012 |
| WO | 2013014000 A1 | 1/2013 |
| WO | WO 2013014000 A1 * | 1/2013 |

* cited by examiner

COLLISION ELIMINATION THROUGH FORCED RESELECTION OF CELLS IN MULTI-SIM MOBILE DEVICES

BACKGROUND

Some new designs of mobile communication devices—such as smart phones, tablet computers, and laptop computers—contain multiple Subscriber Identity Module (SIM) cards that provide users with access to multiple separate mobile telephony networks. Examples of mobile telephony networks include GSM, TD-SCDMA, CDMA2000, and WCDMA. Example multi-SIM mobile communication devices include mobile phones, laptop computers, smart phones, and other mobile communication devices that are able to connect to multiple mobile telephony networks. A mobile communication device that includes a plurality of SIMs that share a radio-frequency (RF) resource for communicating with their respective mobile telephony networks and connects to multiple separate mobile telephony networks is termed a "multi-SIM-multi-standby communication device" or "MSMS communication device." An example is a dual-SIM dual standby (DSDS) device.

A MSMS communication device may include one or more shared RF resources that the multiple subscriptions use to communicate with their respective mobile telephony networks. However, only one subscription may use each RF resource to communicate with its mobile network at a time. Even when a subscription is in "standby" mode, meaning it is not currently actively communicating with the network, it may still need to perform discontinuous reception (DRX) operations to receive network paging messages at regular intervals (i.e., a discontinuous reception period) in order to remain connected to the network. Paging intervals for different subscriptions are not necessarily the same nor are they synchronized. Therefore, it is possible that at a certain times, the multiple subscriptions sharing an RF resource may need to use the RF resource to communicate with their respective mobile networks simultaneously. For example, two subscriptions out of three or more subscriptions may try to use a single RF resource to receive their paging messages simultaneously, or one subscription may be using the RF frontend when another other subscription is scheduled to receive a network paging message.

A "page collision" occurs when page reception times of two or more subscriptions overlap, as happens when the network paging messages for multiple subscriptions are scheduled at the same time. When a page collision occurs, one subscription must be assigned the RF resource to the exclusion of the other subscriptions. In other words, one subscription may block the other subscriptions from communicating with their respective networks (i.e., not receive their schedule page messages). Currently, the paging DRX cycle length (i.e., the length of time from the beginning of one network paging session to the next) for each subscription is determined entirely by the network and occurs in regular, predictable intervals. MSMS communication devices cannot manipulate or reschedule the paging DRX cycle for the multiple subscriptions and, therefore, cannot prevent page collisions from occurring between the multiple subscriptions even though page collisions can be anticipated. These page collisions may greatly affect mobile terminal call success rates of MSMS communications devices, especially when page collisions between two or more subscriptions are persistent.

SUMMARY

The various embodiments include MSMS communication devices and methods that may be implemented in an MSMS communication device for implementing a forced reselection strategy after forcing one or more subscriptions in multiple colliding subscriptions (i.e., "reselecting subscriptions") to perform reselection to neighboring cells. In various embodiments, the MSMS communication device may undo the effects of forced reselection on one or more reselecting subscriptions when continuing to employ forced reselection may be ineffective.

In an embodiment, the MSMS communication device may monitor a subscription in the multiple colliding subscriptions not forced to reselect to a neighboring cell (i.e., a "camped subscription") to determine whether the camped subscription has reselected to a different sector or cell. In response to determining that the camped subscription has reselected to a different sector or cell, the MSMS communication device may force reselecting subscriptions to reselect (i.e., "fall back") to the cells on which the reselecting subscriptions were originally camped (i.e., their "original cells").

In another embodiment, the MSMS communication device may monitor one or more reselecting subscriptions to determine whether they have set up a call on a neighboring cell. If the MSMS communication device detects that a reselecting subscription has set up a call on a neighboring cell, the MSMS communication device may force the reselecting subscription to fall back to its original cell to complete the call.

In an embodiment, the MSMS communication device may maintain a count of the number of times each reselecting subscription performs a forced reselection. The MSMS communication device may only force a reselecting subscription to perform a threshold number of reselections. In a further embodiment, the MSMS communication device may force the reselecting subscription to reselect (i.e., fall back) to its original cell when the reselecting subscription has performed more than the threshold number of reselections.

In another embodiment, the MSMS communication device may preemptively determine the neighboring cells that the reselecting subscriptions may reselect to in order to avoid persistent page collisions. In a further embodiment, the MSMS communication device may determine that a neighboring cell's page timing does not collide with the page timing of another cell in the neighboring cell's paging group based on various information received from the neighboring cell's paging group.

Further embodiments include MSMS communication devices having means for performing functions of the operations described above. Further embodiments include non-transitory processor-readable storage media one which are stored processor-executable instructions configured to cause a processor of a MSMS communication device to perform the operations described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
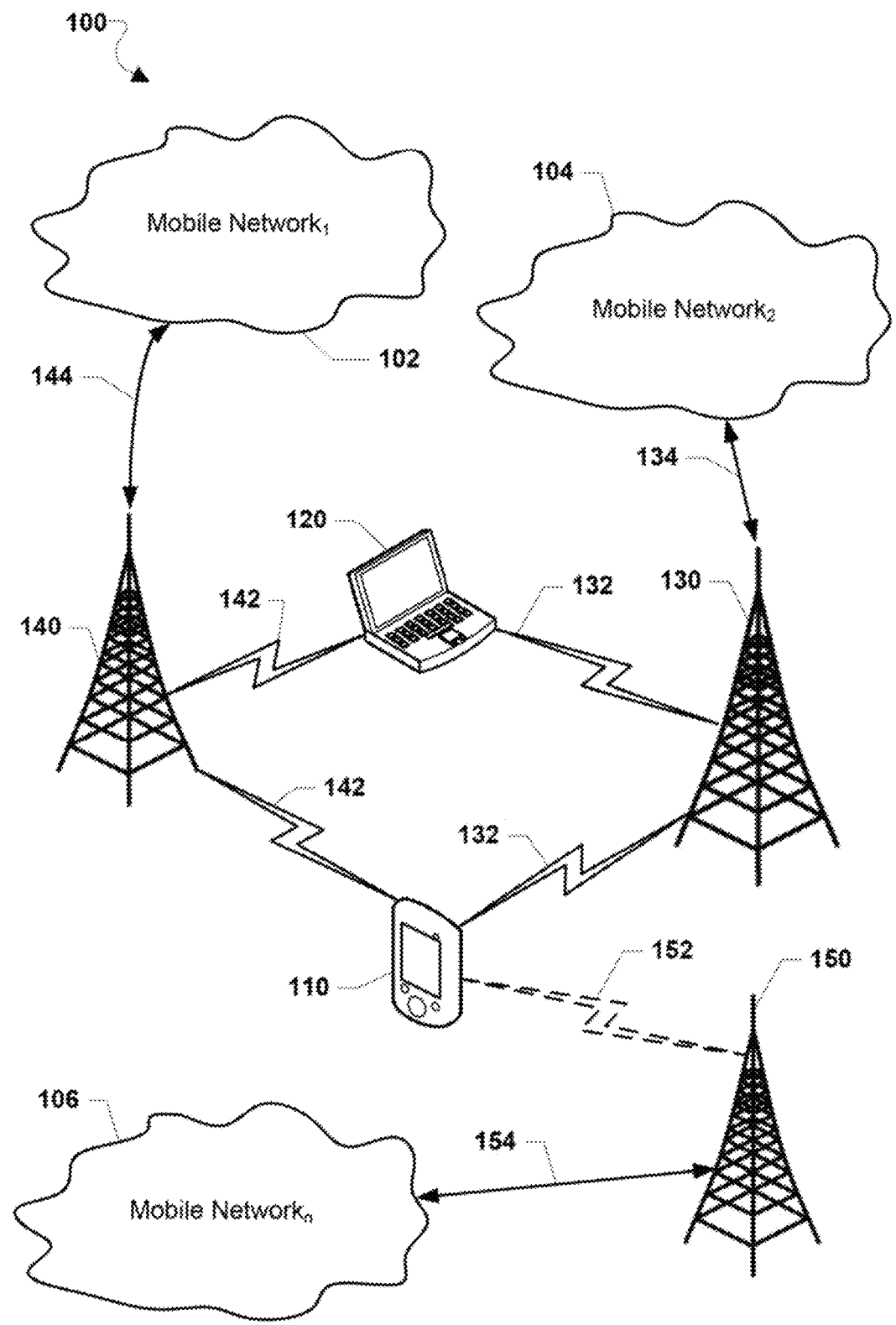
FIG. 1 is a communication system block diagram of mobile telephony networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "MSMS communication device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which individually include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices that may individually maintain a plurality of subscriptions to a plurality of mobile networks through one or more radio transceivers (i.e., one or more shared RF resources).

Subscriptions with overlapping DRX cycles may suffer from persistent page collisions as long as they remain under their respective sector/base station. Current solutions to persistent page collisions include forcing one or more colliding subscriptions operating on the MSMS communication device to reselect to a neighboring cell that has a different DRX cycle in an attempt to avoid such persistent page collisions. However, such solutions presently do not provide mechanisms to address various situations that may affect the subscriptions performance after performing reselection. Without a mechanism for switching subscriptions back to their original (presumably better) cell, this approach can put the forced-away subscriptions in a sub-optimal communication configuration after the original persistent page collision situation is resolved.

In overview, the various embodiments provide methods for implementing a forced reselection strategy on an MSMS communication device after causing colliding subscriptions to perform reselection to neighboring cells. In various embodiments, the MSMS communication device may "undo" the effects of forced reselection in certain situations when continuing to employ forced reselection may be ineffective. In other embodiments, the MSMS communication device may force reselecting subscriptions to reselect to neighboring cells in a paging group based on the page timings of the neighboring cells. Thus, the various embodiments may increase the performance of the colliding subscriptions and may enhance the user's overall experience.

In various embodiments, the MSMS communication device may include a plurality of subscriptions to various mobile telephony networks. The plurality of subscriptions may share an RF resource to communicate with their respective mobile networks. When the MSMS communication device detects a page collision between multiple colliding subscriptions in the plurality of subscriptions, the MSMS communication device may force one or more of the colliding subscriptions (i.e., the "reselecting subscriptions") to perform forced reselection to a neighboring cell while one subscription (i.e., the "camped subscription") remains on the original cell.

In an embodiment, the MSMS communication device may monitor the camped subscription to determine whether the camped subscription has reselected to a different sector or cell. In such an embodiment, the MSMS communication device may force the reselecting subscriptions to "fall back" to their original cells. In a further embodiment, a reselecting subscription may fall back to its original cell by performing a forced reselection from its current cell (i.e., a neighboring cell) to its original cell.

In another embodiment, the MSMS communication device may monitor reselecting subscriptions to determine whether they have set up a call on a neighboring cell. If the MSMS communication device detects that a reselecting subscription has set up a call on a neighboring cell, the MSMS communication device may force the reselecting subscription to fall back to its original cell to complete the call.

In an embodiment, the MSMS communication device may maintain a count of the number of times each reselecting subscription performs a forced reselection. The MSMS communication device may only force a reselecting subscription to perform a threshold number of reselections. In a further embodiment, the MSMS communication device may force the reselecting subscription to fall back to its original cell after the reselecting subscription has performed the threshold number of reselections.

In another embodiment, before the MSMS communication device may force the reselecting subscriptions to perform a subsequent reselection, the MSMS communication device may preemptively determine the neighboring cells that the colliding subscriptions may reselect to in order to avoid persistent page collisions. In a further embodiment, the MSMS communication device may determine the neighboring cells that have page timings that do not collide with another cell's page timing based on received information from the neighboring cells' paging group.

The various embodiments may be implemented within a variety of communication systems 100, such as two or more mobile telephony networks 102, 104, 106, an example of which is illustrated in FIG. 1. Mobile networks 102, 104, 106 typically include a plurality of cellular base stations 130, 140, 150. A first MSMS communication device 110 may be in communication with a first mobile network 102 through a cellular connection 142 to a first base station 140, which may be in communication with the first mobile network 102 via a wired connection 144. The first MSMS communication device 110 may also be in communication with the second mobile network 104 through a cellular connection 132 to a second base station 130, which may be in communication with the second mobile network 104 through a wired connection 134. A second MSMS communication device 120 may similarly communicate with the first mobile network 102 through a cellular connection 142 to a first base station 140. The second MSMS communication device 120 may also communicate with the second mobile network 104 through a cellular connection 132 to the second base station 130.

In a further embodiment, the first MSMS communication device 110 may optionally connection to an arbitrary number of other mobile networks. For example, the first MSMS communication device 110 may optionally connect to a third mobile network 106 through an optional cellular connection 152 to a third base station 150, which may connect to the third mobile network 106 through a wired connection 154. While the second MSMS communication device 120 is not shown connected to the third mobile network 106, it is anticipated that any MSMS communication device may also connect to an arbitrary number of mobile networks.

Cellular connections 132, 142, 152 may be made through two-way wireless communication links, such as 4G, 3G, CDMA, TDMA, WCDMA, GSM, and other mobile telephony communication technologies.

Figure 2:
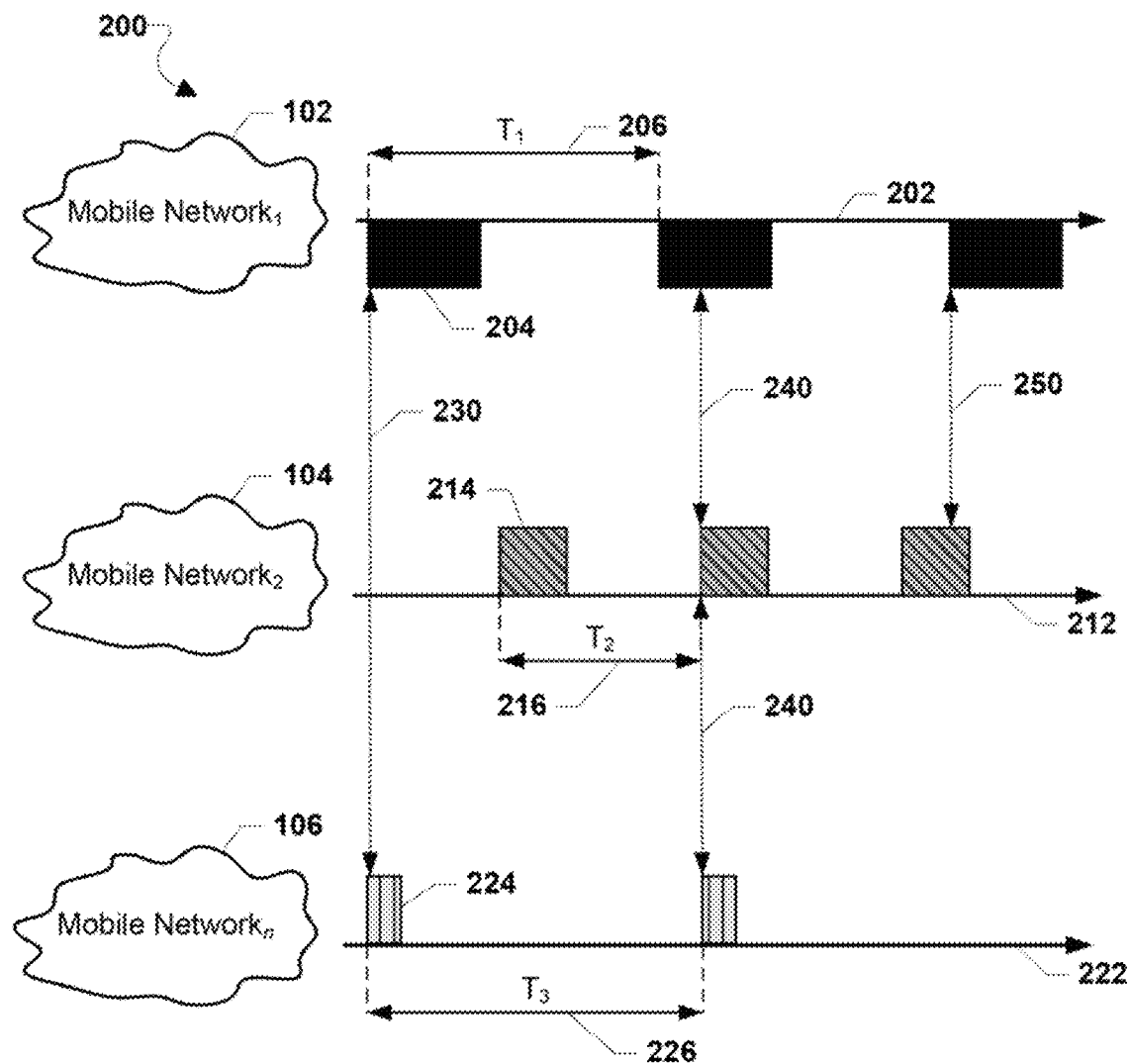
FIG. 2 is a time-line diagram illustrating discontinuous reception of paging messages on multiple mobile networks.

FIG. 2 illustrates a timeline diagram 200 of example page collisions between multiple embodiment subscriptions operating on an MSMS communication device 110. In this example, a first subscription 202 on a first mobile network 102 may have a DRX cycle length 206 equal to $T_1$. The first subscription 202 may also have a paging session duration 204, during which the first subscription 202 may receive and respond to pages sent from the first mobile network 102. Similarly, a second subscription 212 to a second mobile network 104 may have a DRX cycle length 216 equal to $T_2$ and may complete paging communications with the second mobile network 104 during a second paging session duration 214. Additionally, a third subscription 222 to the third mobile network 106 may have a DRX cycle length 226 equal to $T_3$ and may complete paging communications with a third mobile network 106 during a third paging session 224.

Because of the different DRX cycle lengths 206, 216, 226 of the subscriptions 202, 212, 222, various combinations of page collisions 230, 240, 250 may occur. As discussed above, a page collision 230, 240, 250 occurs when two or more subscriptions are attempting to use a shared RF resource simultaneously, such as when a subscription's paging session overlaps with another subscription's paging session. For example, the first subscription 202 may receive a paging message during the second subscription 212's paging session 214 (i.e., page collision 250) or during the third subscription 222's paging session 224 (i.e., page collision 230). A page collision may also occur among more than two subscriptions, as is illustrated by page collision 240, which shows a page collision among the first, second, and third subscriptions 202, 212, 222.

In an embodiment, the MSMS communication device may receive paging messages sequentially, meaning that page collisions are detected sequentially. For example, in response to detecting a page collision 240, the MSMS communication device may respectively receive a paging message for each of the first subscription 202, second subscription 212, and the third subscription 222. Thus, the MSMS communication device may arbitrate the collision among multiple subscriptions sequentially (e.g., performing a first page collision arbitration between the first subscription 202 and the second subscription 212 and then performing a second collision arbitration between the prevailing subscription of the first arbitration and the third subscription 222).

Figure 3:
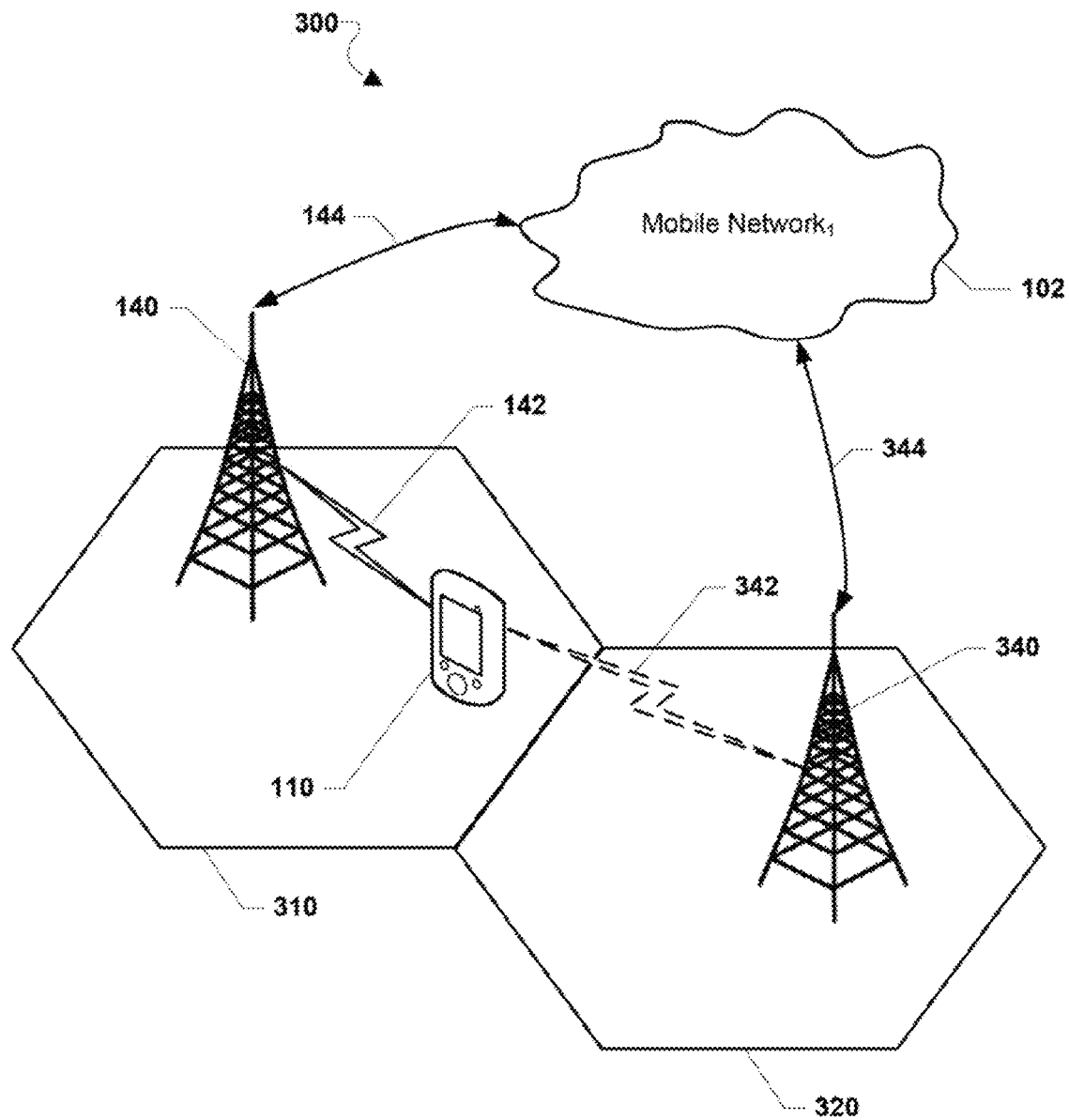
FIG. 3 is a network diagram illustrating forcing a subscription operating on a MSMS communication device to reselect to a neighboring cell.

FIG. 3 is a network diagram 300 illustrating an MSMS communication device forcing a subscription operating on the MSMS communication device to perform cell reselection. In an embodiment, the subscription (not shown) may use a shared RF resource included in the MSMS communication device 110 to maintain a wireless or cellular connection to an original base station 140 in a first cell 310 through a link (e.g., cellular connection 142). The subscription may have selected to the original base station 140 because the channel quality, among other things, may have been better than a neighboring base station 340 located in a nearby second cell 320.

When the MSMS communication device 110 determines that the subscription is a participant in persistent collisions among one or more other subscriptions, the MSMS communication device 110 may force the subscription to reselect over a wireless or cellular link 342 to the neighboring base station 340 located in the second cell 320. The neighboring base station 340 may thereby enable the subscription to receive paging communication from its mobile network 102, which the neighboring base station 340 may receive from the mobile network 102 over a wired connection 344. Because DRX cycles often vary among base stations in most radio access technologies (e.g., GSM, CDMA, etc.), the subscription may likely avoid persistent collisions after acquiring a different DRX cycle after reselecting to the neighboring base station 340.

Figure 4:
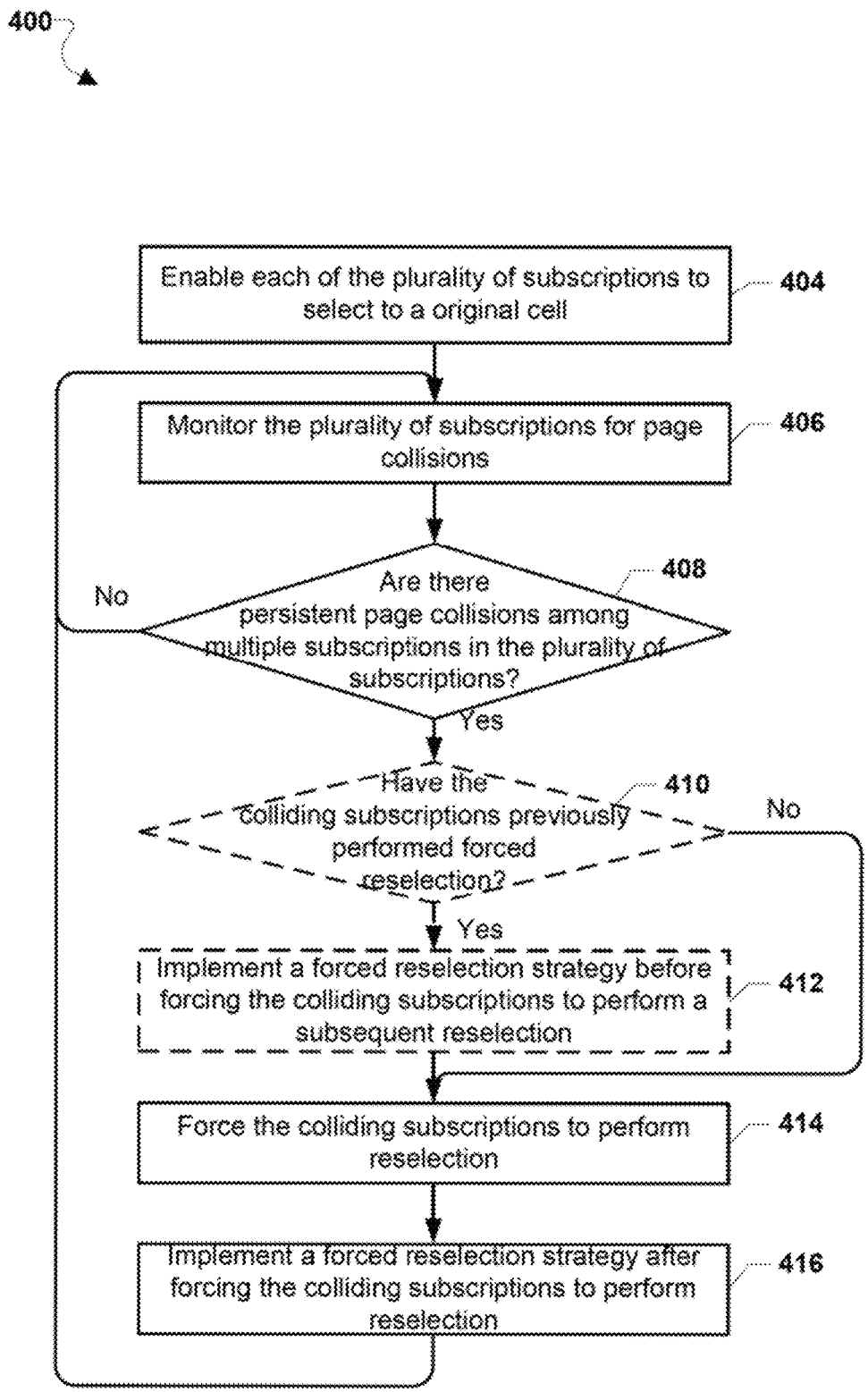
FIG. 4 is a process flow diagram illustrating an embodiment method for implementing a forced reselection strategy after forcing colliding subscriptions to perform reselection.

FIG. 4 illustrates an embodiment method 400 that may be implemented in an MSMS communication device for implementing a forced reselection strategy. In block 404, the MSMS communication device may enable each of a plurality of subscriptions to select to an original cell as per normal operations. In an embodiment, selecting to an original cell may include establishing an initial wireless or cellular connection with a base station that is part of the subscription's mobile access network. For example, after the MSMS communication device powers up, a subscription to a CDMA mobile network may select to a cell serviced by a base station connected to the CDMA mobile network.

In another embodiment, the plurality of subscriptions operating on the MSMS communication device may each select to a cell based on, for example, the cell's channel quality, signal strength, and various other call-quality characteristics. Alternatively, in another embodiment, the MSMS communication device may attempt to preemptively avoid persistent page collisions among the plurality of subscriptions by forcing the plurality of subscriptions to select to cells in a paging group that have page timings (i.e., page burst arrival times) that do not collide. Preemptively avoiding persistent page collisions by selectively choosing cells that have a lower chance of page collisions is further discussed below with reference to FIGS. 9 and 10.

In block 406, the MSMS communication device may monitor the plurality of subscriptions for page collisions. In an embodiment, and as discussed above with reference to FIG. 2, a page collision may occur when two or more subscriptions wake up from their idling processes to receive page communications from their respective mobile access networks at the same time. Because only one subscription may use the shared RF resource at a time, the other subscriptions will not receive their pages (i.e., the other subscriptions will have their pages blocked).

In determination block 408, the MSMS communication device may determine whether there are persistent page collisions among multiple subscriptions in the plurality of subscriptions. In an embodiment, the MSMS communication device may determine whether collisions are persistent using various techniques, including determining the subscriptions' DRX cycles and determining instances in which two or more subscriptions' paging sessions consistently overlap. For example, the MSMS communication device may determine that a particular subscription with a DRX cycle of 941 milliseconds collides with another subscription with a DRX cycle of 470 milliseconds every time the particular subscription attempts to receive a page. If the MSMS communication device determines that there are no persistent page collisions among the plurality of subscriptions (i.e., determination block 408="No"), the MSMS communication device may continue performing in block 406 by monitoring the plurality of subscriptions for page collisions.

If the MSMS communication device determines that there are persistent page collisions among multiple subscriptions (i.e., determination block 408="Yes"), the MSMS communication device may optionally determine in optional determination block 410 whether the colliding subscriptions have previously performed forced reselection. In an embodiment, the MSMS communication device may maintain a record of the number of times each of the plurality of subscriptions has performed forced reselection. In a further embodiment, the MSMS communication device may limit the number of times a subscription may be forced to perform reselection as discussed below with reference to FIG. 8.

If the MSMS communication device determines that the colliding subscriptions have not previously performed forced reselection (i.e., optional determination block 410="No"), the MSMS communication device may continue performing in block 414. Otherwise, if the MSMS communication device determines that the colliding subscriptions have previously performed forced reselection (i.e., optional determination block 410="Yes"), the MSMS communication device may optionally implement a reselection strategy before forcing the colliding subscriptions to perform a subsequent forced reselection in optional block 412. In an embodiment, the MSMS communication device may perform additional actions before forcing colliding subscriptions to perform a subsequent reselection. These additional actions may alter the manner in which the MSMS communication device implements a subsequent forced reselection. The MSMS communication device may continue performing in block 414.

In block 414, the MSMS communication device may force the colliding subscriptions to perform reselection. As described above with reference to FIG. 3, the MSMS communication device may force the colliding subscriptions to reselect to another cell to change the colliding subscriptions' DRX cycles in the hopes that the new DRX cycles will not overlap, thereby eliminating the persistent collision among the colliding subscriptions. The process of forcing the colliding subscriptions to reselect to another cell is described below with reference to FIG. 5.

In block 416, the MSMS communication device may implement a forced reselection strategy after forcing the colliding subscriptions to perform reselection. In an embodiment, the MSMS communication device may begin monitoring various aspects of the colliding subscriptions to determine, for example, whether the colliding subscriptions' circumstances have changed, thereby necessitating a response from the MSMS communication device. For example, a camped subscription may have reselected to another cell and obtained a new DRX cycle, potentially ending the need for the reselecting subscriptions to stay selected to neighboring cells. In another example, one of the reselecting subscriptions may have set up a call on a neighboring cell. Implementing reselection strategies after performing a forced reselection is further described below with reference to FIGS. 6 and 7.

The MSMS communication device may also continue monitoring the plurality of subscriptions for collisions in block 406 and determining whether there are still persistent page collisions in determination block 408 after forcing the colliding subscriptions to perform reselection.

Figure 5:
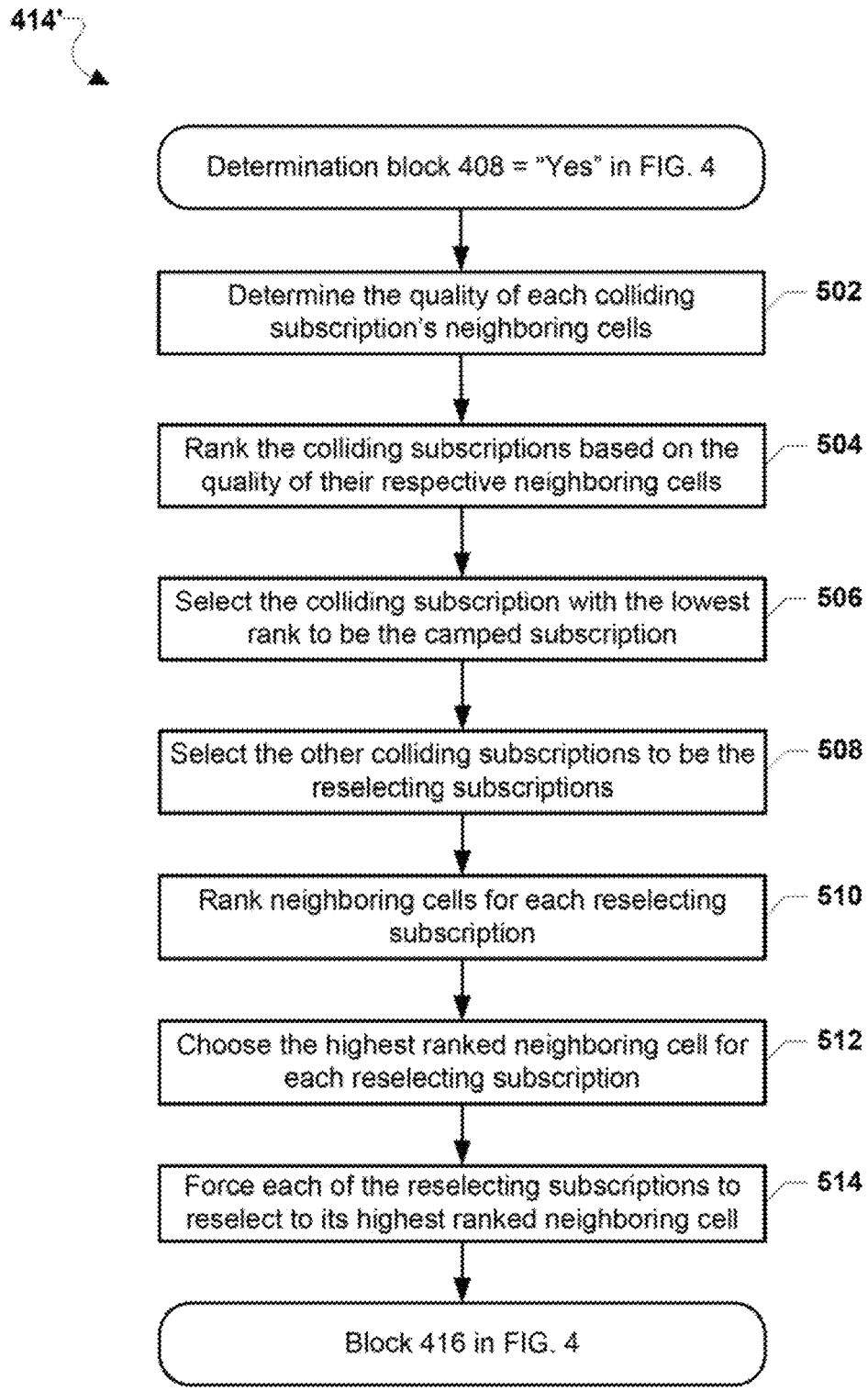
FIG. 5 is a process flow diagram illustrating an embodiment method for forcing colliding subscriptions to reselect to neighboring cells.

FIG. 5 illustrates an embodiment method 414' that may be implemented on an MSMS communication device for forcing colliding subscriptions to reselect to neighboring cells. In an embodiment, the steps of method 414' may correspond to the actions the MSMS communication device may perform in block 414 of method 400 with reference to FIG. 4. The MSMS communication device may begin performing method 414' after determining that there are persistent page collisions among the plurality of subscriptions (i.e., determination block 408="Yes" in FIG. 4).

In block 502, the MSMS communication device may determine the quality of each of the colliding subscriptions' neighboring cells. For example, if two subscriptions have persistent page collisions, the MSMS communication device may determine the quality of each of the subscription's respective neighboring cells based on various criteria, such as receiver power. In block 504, the MSMS communication device may rank the colliding subscriptions based on the quality of their respective neighboring cells. For example, the colliding subscription with the best neighboring cell or cells may be ranked highest and the colliding subscription with the worst neighboring cells (e.g., lowest receiver power, etc.) may be ranked last.

In block 506, the MSMS communication device may select the colliding subscription with the lowest rank to be the camped-on subscription (i.e., to be the subscription that remains on its original cell). The lowest ranking colliding subscription may remain on the original cell because its neighboring cells are the lowest quality, and thus, the lowest ranking colliding subscription may suffer the most by reselecting to a neighboring cell. The MSMS communication device may also select the other colliding subscriptions to be the reselecting subscriptions (i.e., subscriptions that are forced to reselect from their respective original cells to neighboring cells) in block 508.

In block 510, the MSMS communication device may rank the neighboring cells for each of the reselecting subscriptions. In an embodiment, the MSMS communication device may use ranking criteria that may include channel quality and signal strength. The MSMS communication device may also choose the highest ranked neighboring cell for each reselecting subscription in block 512. In another embodiment (not shown), the MSMS communication device may maintain a list of neighboring cells to which a colliding subscription has previously been forced to reselect. In such embodiment, when the MSMS communication device determines that there are still page collisions, the MSMS communication device may only force a reselecting subscription to perform subsequent reselects to neighboring cells to which the reselecting subscription has not previously selected because forcing reselecting to the previously selected neighboring cells has not avoided persistent page collisions.

In block 514, the MSMS communication device may force each reselecting subscription to reselect to its highest ranked neighboring cell. In an embodiment, reselecting to a highest ranked neighboring cell may ensure that a reselecting subscription is selecting to a neighboring cell that will, for example, provide the next best call quality. The MSMS communication device may continue by implementing a forced reselection strategy as discussed above with reference to block 416 of method 400 illustrated in FIG. 4.

Figure 6:
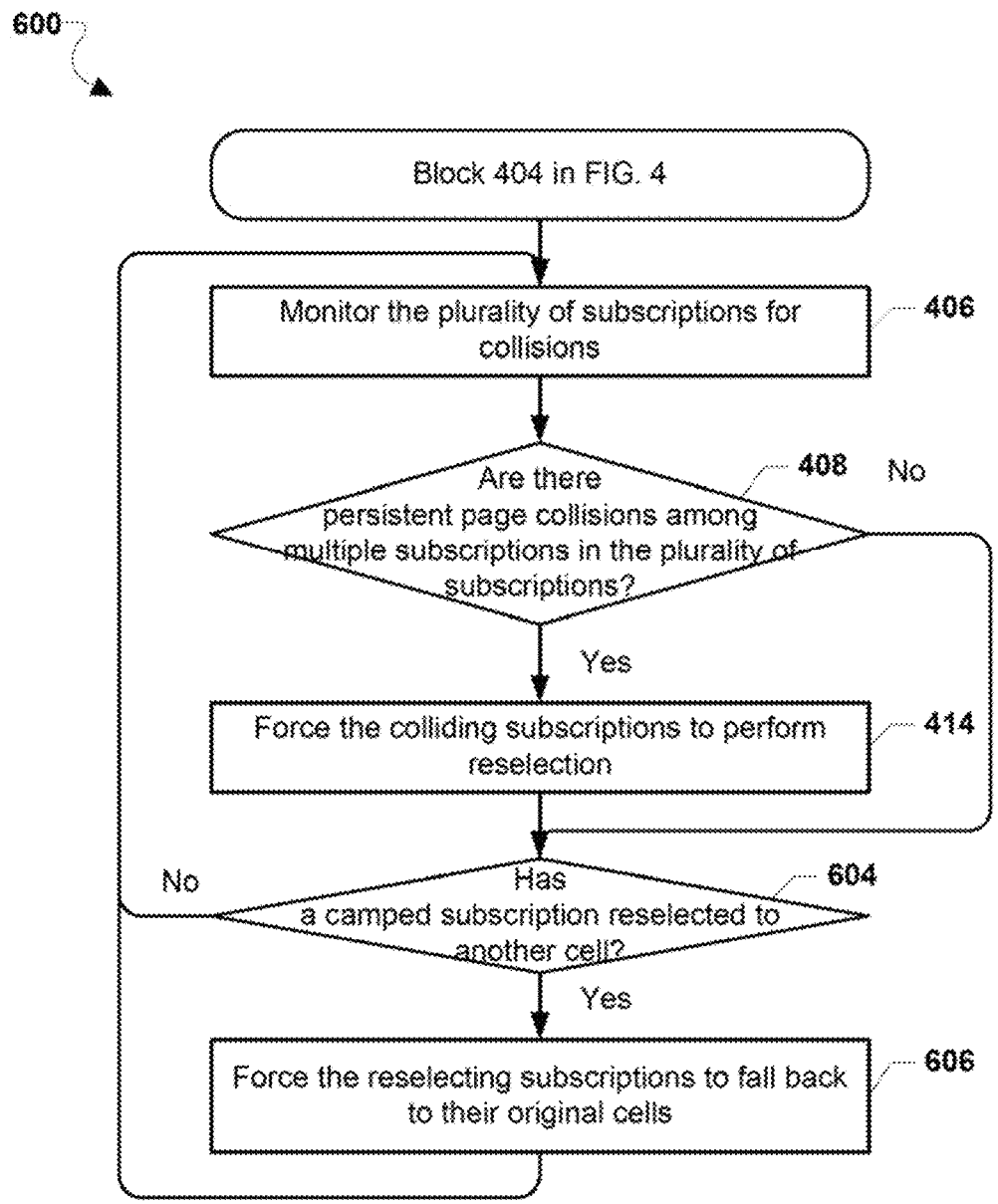
FIG. 6 is a process flow diagram illustrating an embodiment method for causing reselecting subscriptions to fall back when a camped subscription's reselects to another cell.

FIG. 6 illustrates an embodiment method 600 that may be implemented on an MSMS communication device for causing reselecting subscriptions to fall back to their original cells when a camped subscription reselects to another cell. The MSMS communication device may begin performing method 600 after enabling each of the plurality of subscriptions operating on the MSMS communication device to select to an original cell in block 404 of method 400 as described above with reference to FIG. 4.

In block 406, the MSMS communication device may monitor the plurality of subscriptions for collisions. In one embodiment, the MSMS communication device may monitor each of the plurality of subscriptions' paging channels for paging messages from the plurality of subscriptions' respective mobile access network. In determination block 408, the MSMS communication device may determine whether there are persistent page collisions among multiple subscriptions in the plurality of subscriptions. In an embodiment, the MSMS communication device may determine each of the plurality of subscriptions' start for their respective paging sessions based on their DRX cycle lengths. The MSMS communication device may also monitor the beginnings of each of the plurality of subscriptions' paging sessions to determine whether multiple subscriptions continue to receive page messages at the same time (i.e., whether there are persistent page collisions).

If the MSMS communication device determines that there are no persistent page collisions among multiple subscriptions in the plurality of subscriptions (i.e., determination block 408="No"), the MSMS communication device may determine whether a camped subscription has reselected to another cell in determination block 604 as described below. Otherwise, if the MSMS communication device determines that there are persistent page collisions among multiple subscriptions in the plurality of subscriptions (i.e., determination block 408="Yes"), the MSMS communication device may force the colliding subscriptions to perform reselection in block 414. As discussed above with reference to block 414 of method 400 in FIG. 4, the MSMS communication device may select a camped subscription from the colliding subscriptions to remain on its original cell and may force the other subscriptions (i.e., the reselecting subscriptions) to reselect to their best respective neighboring cell.

In determination block 604, the MSMS communication device may determine whether a camped subscription has reselected to another cell. In an embodiment, the camped subscription may reselect to another cell for various reasons. For example, the MSMS communication device may have moved to a different cell, thereby causing the camped subscription to reselect to a neighboring cell that is now closer (i.e., has a higher call quality) than the camped subscription's original cell. If the MSMS communication device determines that the camped subscription has not reselected to another cell (i.e., determination block 604="No"), the MSMS communication device may continue performing in block 406 by monitoring the plurality of subscriptions for collisions.

However, if the MSMS communication device determines that the camped subscription has reselected to another cell (i.e., determination block 604="Yes"), the MSMS communication device may force the reselecting subscriptions to fall back to their original cells in block 606. In an embodiment, once the camped subscription reselects, the MSMS communication device may force the reselecting subscriptions to fall back to their original cells because the persistent page collisions may no longer exist after the camped subscription reselects to another cell. Also, in another embodiment, the MSMS communication device may force the reselecting subscriptions to reselect to their original cells because their original cells are preferred to (e.g., have a better call quality than) their neighboring cells.

The MSMS communication device may continue monitoring the plurality of subscriptions for collisions in block 406 and determining whether there are still persistent page collisions in determination block 408.

Figure 7:
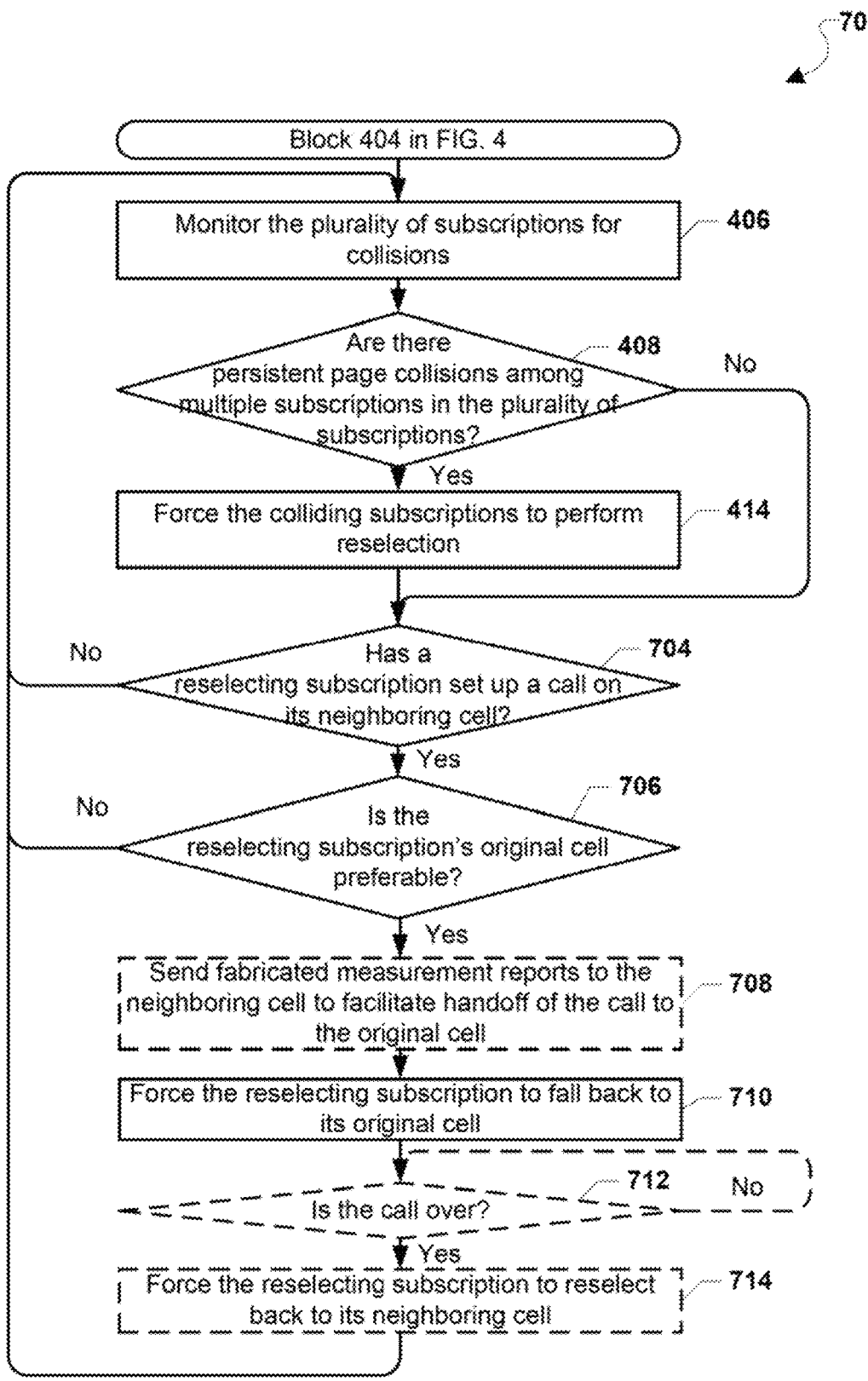
FIG. 7 is a process flow diagram illustrating an embodiment method for configuring a reselecting subscription to fall back to its original cell to complete a call after setting up the call on a neighboring cell.

FIG. 7 illustrates an embodiment method 700 that may be implemented in an MSMS communication device for configuring a reselecting subscription to fall back to its original cell after setting up a call on a neighboring cell. The MSMS communication device may begin performing method 700 after enabling each of the plurality of subscriptions operating on the MSMS communication device to select to a respective original cell in block 404 of method 400 in FIG. 4.

In block 406, the MSMS communication device may monitor the plurality of subscriptions for collisions. In one embodiment, the MSMS communication device may monitor the plurality of subscriptions just before they perform wake ups. In determination block 408, the MSMS communication device may determine whether there are persistent page collisions among multiple subscriptions in the plurality of subscriptions. The MSMS communication device may make this determination by performing operations discussed above regarding determination block 408 of method 400 with reference to FIG. 4.

If the MSMS communication device determines that there are no persistent page collisions among the multiple subscriptions in the plurality of subscriptions (i.e., determination block 408="No"), the MSMS communication device may determine whether a particular reselecting subscription has set up a call on its neighboring cell in determination block 704 as discussed below. Otherwise, if the MSMS communication device determines that there are persistent page collisions among the multiple subscriptions in the plurality of subscriptions (i.e., determination block 408="Yes"), the MSMS communication device may force the colliding subscriptions to perform reselection in block 414. In an embodiment, the MSMS communication device may select a camped subscription to remain on its original cell while forcing the other subscriptions (i.e., the reselecting subscriptions) to reselect to a neighboring cell.

In determination block 704, the MSMS communication device may determine whether a particular reselecting subscription has set up a call on its neighboring cell. In other words, the MSMS communication device may determine whether a subscription, after being forced to reselect to a neighboring cell, has set up a call on the neighboring cell to which it was forced to reselect. In an embodiment, the MSMS communication device may monitor each of the reselecting subscriptions for call setups.

If the MSMS communication device determines that a reselecting subscription has not set up a call on its neighboring cell (i.e., determination block 704="No"), the MSMS communication device may continue monitoring the plurality of subscriptions for collisions in block 406 by. In an embodiment, the MSMS communication device may always determine that a particular reselecting subscription has not set up a call on a neighboring cell when there are no reselecting subscriptions (i.e., none of the plurality of subscriptions has been forced to reselect to a neighboring cell).

If the MSMS communication device determines that a reselecting subscription has set up a call on its neighboring cell (i.e., determination block 704="Yes"), the MSMS communication device may determine whether the reselecting subscription's original cell is preferable to the reselecting subscription's neighboring cell in determination block 706, such as exhibiting superior link characteristics. In an embodiment, the MSMS communication device may monitor and measure the particular reselecting subscription's original cell to determine whether the original cell meets certain call-quality thresholds based on, among other things, call quality, signal strength, etc. For example, the MSMS communication device may have moved away from the reselecting subscription's particular original cell, thereby reducing the signal strength from the original cell below an acceptable threshold. In another embodiment, the MSMS communication device may not force the reselecting subscription to fall back to its original cell when the original cell does not meet those certain call-quality thresholds.

If the MSMS communication device determines that the particular reselecting subscription's original cell is not acceptable (i.e., determination block 706="No"), the MSMS communication device may continue monitoring the plurality of subscriptions for collisions in block 406. In an embodiment, the MSMS communication device may allow the particular reselecting subscription to continue the call on its neighboring cell when the particular reselecting subscription's original cell is no longer acceptable.

If the MSMS communication device determines that the particular reselecting subscription's original cell is still acceptable or preferable to the current cell (i.e., determination block 706="Yes"), the MSMS communication device may optionally send fabricated measurement reports to the neighboring cell to facilitate handoff of the call to the original cell in optional block 708. In an embodiment, the MSMS communication device may send false energy reports for the original cell to the neighboring cell. These false reports may report higher energies at the original cell than actual energy measurements. In such embodiment, the false energy reports of the original cell may cause the neighboring cell to begin handoff procedures faster, thereby enabling the reselecting subscription to continue its call on the original cell sooner. In block 710, the MSMS communication device may force the reselecting subscription to fall back to its original cell.

In optional determination block 712, the MSMS communication device may optionally determine whether the particular reselecting subscription's call is over. In an embodiment, the MSMS communication device may configure the reselecting subscription to remain on its original cell only during is call. If the MSMS communication device determines that the reselecting subscription's call is not over (i.e., optional determination block 712="No"), the MSMS communication device may continue to perform this determination.

If the MSMS communication device determines that the particular reselecting subscription's call is over (i.e., optional determination block 712="Yes"), the MSMS communication device may force the reselecting subscription to reselect back to its neighboring cell in optional block 714 if persistent call paging conditions persist. In an embodiment, once the reselecting subscription's call is over, the MSMS communication device may force the reselecting subscription to reselect back to its neighboring cell to avoid future persistent collisions that may have been avoided when the reselecting subscription reselected to the neighboring cell.

These operations may be implemented in a continuous loop and the MSMS communication device may continue monitoring the plurality of subscriptions for collisions in block 406.

Figure 8:
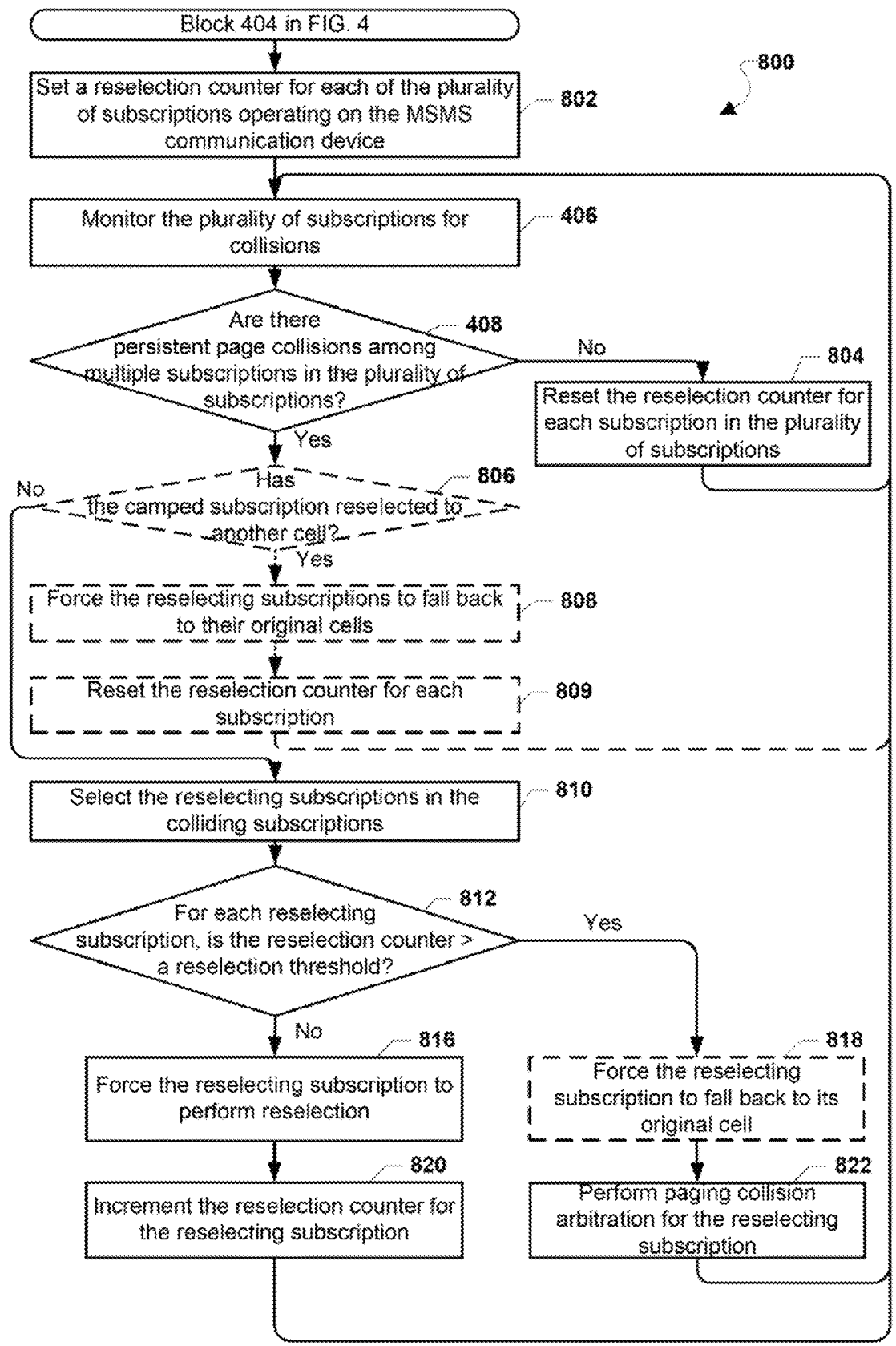
FIG. 8 is a process flow diagram illustrating an embodiment method for managing the number of times the MSMS communication device forces a subscription to reselect to a neighboring cell.

FIG. 8 illustrates an embodiment method 800 that may be implemented on an MSMS communication device for managing the number of times the MSMS communication device forces a subscription to reselect to a neighboring cell. A subscription performing a reselection to another cell may not receive numerous pages or other information from its mobile access network during the reselection process. Thus, in an embodiment, the MSMS communication device may mitigate such effects of reselection on a subscription by limiting the number of times each subscription may be forced to reselect to another cell. The MSMS communication device may begin performing method 800 after enabling each of the plurality of subscriptions operating on the MSMS communication device to select to an original cell in block 404 of method 400 in FIG. 4.

In block 802, the MSMS communication device may set a reselection counter for each of the plurality of subscriptions operating on the MSMS communication device. In an embodiment, the MSMS communication device may set the reselection counter to any arbitrary value (e.g., zero) that may be used to determine the number of times that a subscription has been forced to reselect to a neighboring cell.

In block 406, the MSMS communication device may monitor the plurality of subscriptions for collisions. In determination block 408, the MSMS communication device may determine whether there are persistent page collisions among multiple subscriptions in the plurality of subscriptions. The MSMS communication device may make this determination by performing the operations discussed above with reference to determination block 408 of method 400 illustrated in FIG. 4.

If the MSMS communication device determines that there are no persistent page collisions among the multiple subscriptions in the plurality of subscriptions (i.e., determination block 408="No"), the MSMS communication device may reset the reselection counter for each subscription in the plurality of subscriptions in block 804. In an embodiment, the MSMS communication device may reset the reselection counters for the plurality of subscriptions when there are no persistent collisions. The MSMS communication device may continue performing in block 406 by monitoring the plurality of subscriptions for collisions.

If the MSMS communication device determines that there are persistent page collisions among multiple subscriptions in the plurality of subscriptions (i.e., determination block 408="Yes"), the MSMS communication device may optionally determine in optional determination block 806 whether the camped subscription has reselected to another cell. If the MSMS communication device determines that the camped subscription did not reselect to another cell (i.e., optional determination block 806="No"), the MSMS communication device may continue performing in block 810.

If the MSMS communication device determines that the camped subscription reselected to another cell (i.e., optional determination block 806="Yes"), the MSMS communication device may optionally force the reselecting subscriptions to fall back to their original cells in optional block 808. In an embodiment, the MSMS communication device may force the reselecting subscriptions to fall back to their original cells because their original cells may be preferred to their current cells. The MSMS communication device may also reset the reselection counter to zero for each of the plurality of subscriptions in block 809. In an embodiment, the MSMS communication device may, in effect, restart the process of detecting persistent collisions and forcing subscriptions to reselect in response.

The MSMS communication device may continue monitoring the plurality of subscriptions for collisions in block 406 and determining whether there are still persistent page collisions in determination block 408. In an embodiment, the MSMS communication device may need to determine whether persistent collisions are still occurring after forcing the reselecting subscriptions to fall back to their original cells.

In block 810, the MSMS communication device may select the reselecting subscriptions in the colliding subscriptions. As discussed above with reference to block 506 and block 508 of method 500 illustrated in FIG. 5, the MSMS communication device may select a camped-on subscription that will remain on its original cell from the multiple colliding subscriptions. The MSMS communication device may also select the remaining colliding subscriptions to be the reselecting subscriptions.

In determination block 812, the MSMS communication device may determine for each reselecting subscription whether each reselecting subscription's reselection counter is greater than a reselection threshold. In an embodiment, the reselection threshold may be a maximum number of times that a subscription may be forced to reselect. For example, the reselection threshold may be the maximum number of times a subscription may be forced to reselect without causing a significant decrease in performance.

If the MSMS communication device determines that a reselecting subscription's counter is not greater than a reselection threshold (i.e., determination block 812="No"), the MSMS communication device may force the reselecting subscription to perform reselection in block 816. For example, the MSMS communication device may force the reselecting subscription to reselect to the next best neighboring cell to which the reselecting subscription has not previously selected. The MSMS communication device may also increment the reselection counter for the reselecting subscription in block 820. While these operations are discussed in the context of one reselecting subscription, the MSMS communication device may similarly perform these steps with regards to each reselecting subscription that has a reselection counter that is less than or equal to a reselection threshold. The MSMS communication device may continue performing in block 406 by monitoring the plurality of subscription for collisions.

If the MSMS communication device determines that a reselecting subscription's count equals or exceed a reselection threshold (i.e., determination block 812="Yes"), the MSMS communication device may optionally force the reselecting subscription to fall back to its original cell in optional block 818. In an embodiment, the MSMS communication device may only force the reselecting subscription to fall back when the reselecting subscription's original cell is preferable. The MSMS communication device may also perform page collision arbitration for the reselecting subscription in block 822. In an embodiment, once a reselecting subscription exceeds the reselection threshold, the MSMS communication device may no longer force that subscription to perform reselection and, instead, may perform page collision arbitration between the reselecting subscription and other colliding subscriptions. For example, the MSMS communication device may enable alternate subscriptions in the colliding subscriptions to receive their respective pages when a collision occurs. The MSMS communication device may continue monitoring the plurality of subscriptions for collisions in block 406.

Figure 9:
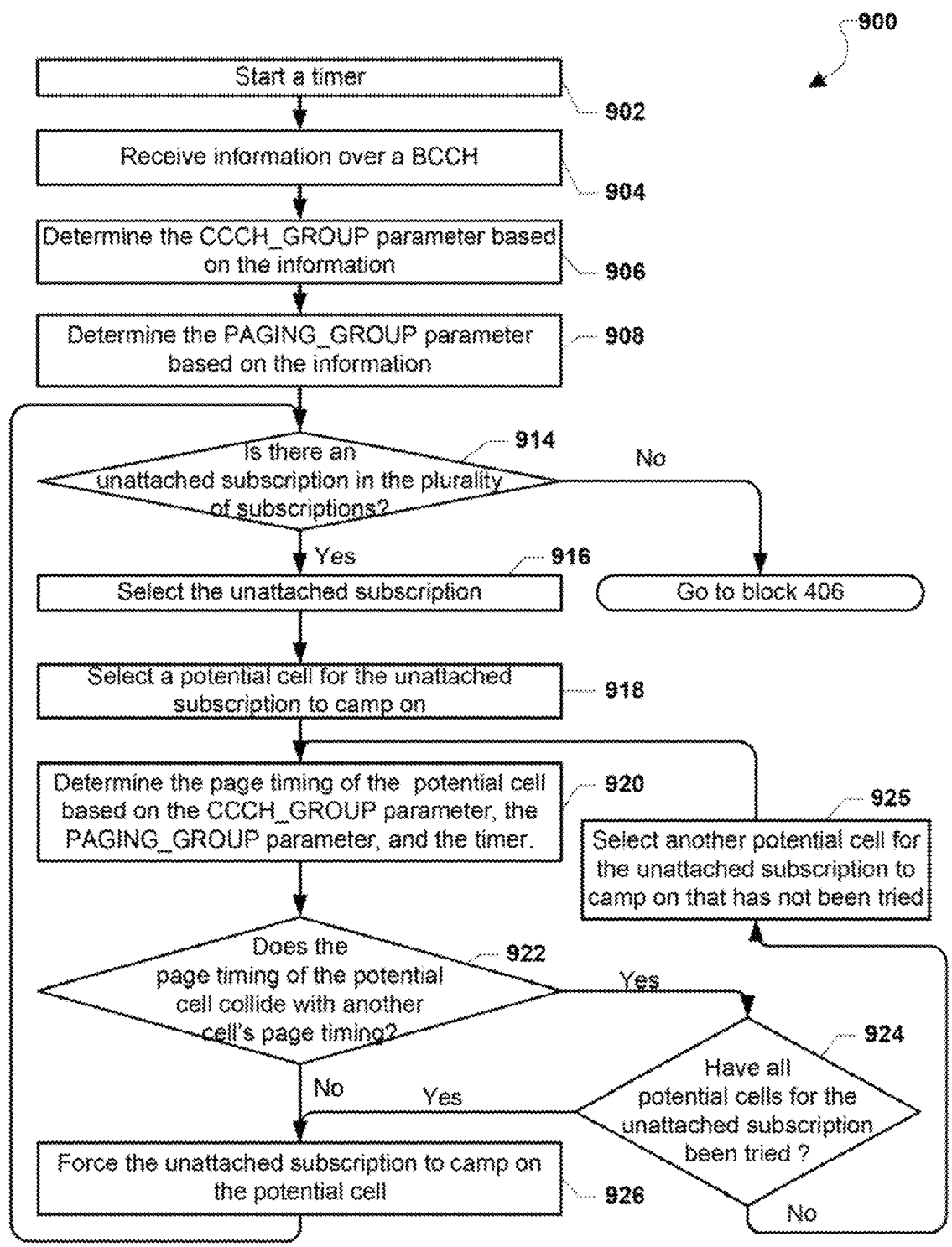
FIG. 9 is a process flow diagram illustrating an embodiment method for selecting original cells for the plurality of subscriptions operating on the MSMS communication device.
Figure 10:
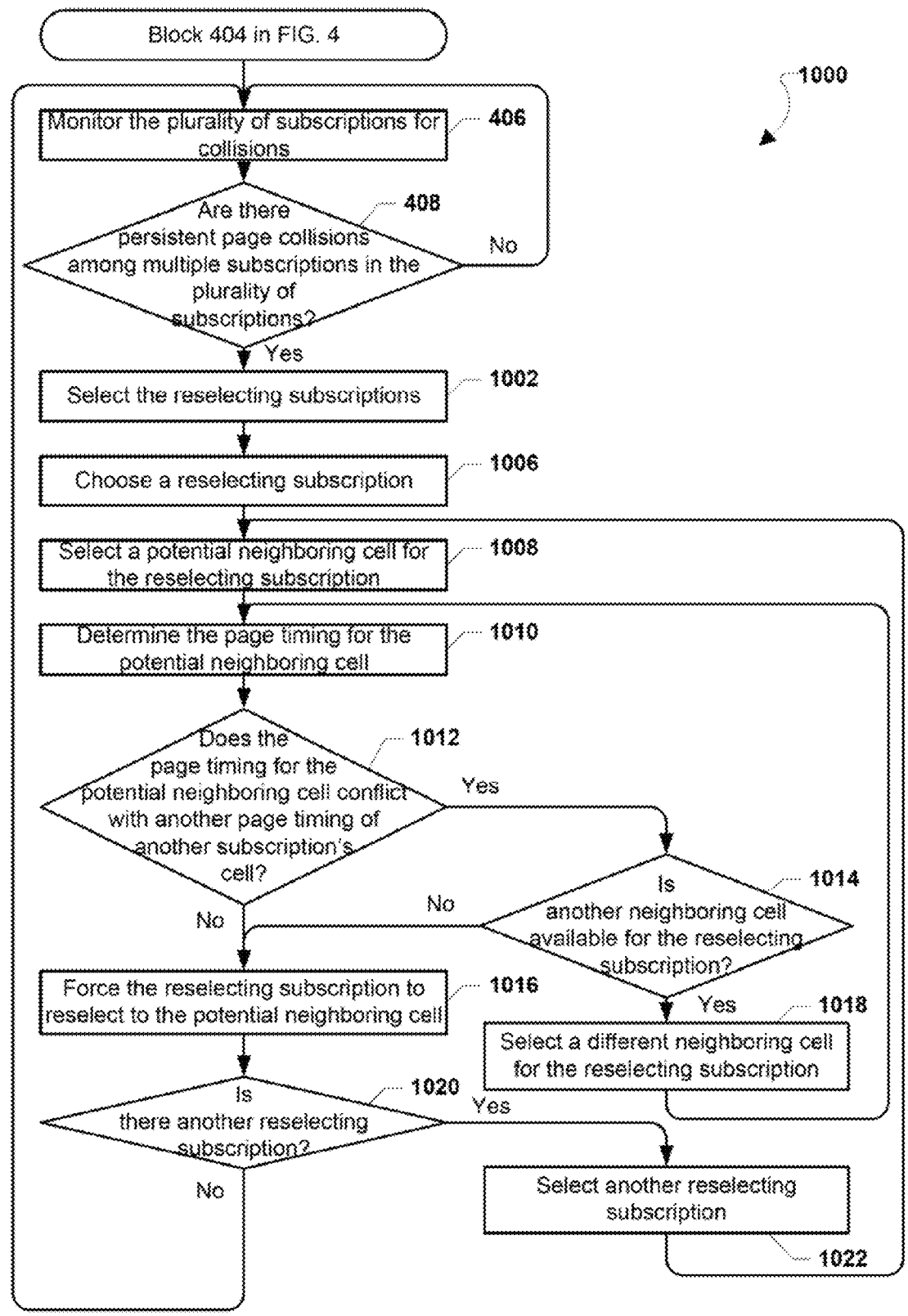
FIG. 10 is a process flow diagram illustrating an embodiment method for forcing reselecting subscriptions to reselect to cells that avoid persistent page collisions.

FIGS. 9-10 illustrate embodiment methods 900, 1000 that may be implemented on a MSMS communication device for forcing a subscription to select to a cell in a GSM paging group based on the cell's page timing. In an embodiment, the MSMS communication device may determine the member cells of a paging group and their page timings (e.g., the arrival time of page bursts) based on various parameters and other information received over a broadcast control channel (BCCH).

FIG. 9 illustrates an embodiment method 900 that may be implemented in an MSMS communication device for selecting original cells for each of a plurality of subscriptions to camp on initially. In an embodiment, the MSMS communication device may "smartly" select which original cells each of the plurality of subscriptions camps on to ensure that the plurality of subscriptions have a low or no chance of experiencing persistent page collisions. The MSMS communication device may begin performing method 900 by starting a timer in block 902. The timer may be a call timer with a resolution of a quarter of a GSM symbol time (12/13 microseconds) and a period of 1 GSM super frame (i.e., 51×26 GSM TDMA frames). In an embodiment, the MSMS communication device may use the timer, among other things, when determining the arrival times of page bursts from various cells in a paging group.

In block 904, the MSMS communication device may receive a synchronization channel (i.e., SCH) transmitted over channel C0 of a broadcast control channel (i.e. BCCH). In an embodiment, the SCH may include information describing a synchronization resolution up to one half of the symbol time of a GSM symbol (i.e., 24/13 microseconds).

In block 906, the MSMS communication device may determine the CCCH_GROUP parameter. In an embodiment, each common control channel (i.e., CCCH) includes a group (i.e., a common control channel group or CCCH_GROUP) of subscriptions in idle mode. The subscriptions in the CCCH_GROUP may listen for paging messages and may make random accesses only on the specific CCCH to which the CCCH_GROUP belongs. In block 908, the MSMS communication device may determine the PAGING_GROUP parameter. In an embodiment, a PAGING_GROUP parameter may include all subscriptions listening to a particular paging block. In a further embodiment, after determining the CCCH_GROUP parameter and the PAGING-GROUP parameter, the MSMS communication device may be able to determine the exact time of arrival of page bursts from various cells.

In determination block 914, the MSMS communication device may determine whether there is an unattached subscription in the plurality of subscriptions. An unattached subscription may be a subscription that has not yet camped on an original cell. If the MSMS communication device determines that there are no unattached subscriptions (i.e., determination block 914="No"), the MSMS communication device may continue monitoring the plurality of subscriptions for collisions in block 406 as described above with reference to FIG. 4.

If the MSMS communication device determines that there is an unattached subscription in the plurality of subscriptions (i.e., determination block 914="Yes"), the MSMS communication device may select the unattached subscription in block 916. In block 918, the MSMS communication device may select a potential cell for the unattached cell to camp on. In an embodiment, a potential cell may be a nearby or neighboring cell that the unattached subscription may camp on.

The MSMS communication device may also determine the page timing of the potential cell in block 920 based on the CCCH_GROUP parameter, the PAGING_GROUP parameter, and the timer. In an embodiment, the MSMS communication device may leverage the timer and its knowledge of the CCCH_GROUP and PAGING_GROUP parameters to identify the over-the-air arrival time of page bursts to the potential cell (i.e., the page timing of the potential cell). Once the potential cell's page timing is determined, the MSMS communication device may determine whether the potential cell's page timing collides with the page timing for another cell that has a subscription camped on it in determination block 922. In other words, the MSMS communication device may determine whether the unattached subscription would experience persistent page collisions if it camped on the potential cell. For example, if one subscription's cell has page burst over-the-air arrival times of $T_0$ and the potential cell's page burst arrival times are $T_1$, the MSMS communication device may use $T_0$ and $T_1$ to determine whether the potential cell's page timing collides with the other cell's page timing.

If the MSMS communication device determines that the potential cell's page timing does not collide with the page timing for another cell that has a subscription camped on it (i.e., determination block 922="No"), the MSMS communication device may force the unattached subscription to camp on the potential cell in block 926. The MSMS communication device may also continue performing in determination block 914 by determining whether there is another unattached subscription.

If the MSMS communication device determines that the potential cell's page timing collides with the page timing for another cell that has a subscription camped on it (i.e., determination block 922="Yes"), the MSMS communication device may determine whether all potential cells for the unattached subscription have been tried in determination block 924. In an embodiment, there may be a finite number of potential cells to which an unattached subscription may camp on. If the MSMS communication device determines that there is at least one untried potential cell for the unattached subscription (i.e., determination block 924="No"), the MSMS communication device may select another potential cell for the unattached cell to camp on that has not been tried in block 925. The MSMS communication device may continue determining the page timing of the potential cell in block 920.

If the MSMS communication device determines that all potential cells for the unattached subscription have been tried (i.e., determination block 924="Yes"), the MSMS communication device may force the unattached subscription to camp on the potential cell in block 926. In other words, the unattached subscription may not have any potential cells to camp on that would avoid persistent page collisions but must camp on a cell nevertheless. The MSMS communication device may continue determining whether there is another unattached subscription in the plurality of subscriptions in determination block 914.

FIG. 10 illustrates an embodiment method 1000 that may be implemented in an MSMS communication device for forcing reselecting subscriptions to reselect to cells that the MSMS communication device determines will avoid persistent page collisions. The MSMS communication device may begin performing method 1000 after enabling each of the plurality of subscriptions operating on the MSMS communication device to select to an original cell in block 404 of method 400 in FIG. 4.

In block 406, the MSMS communication device may monitor the plurality of subscriptions for collisions. In determination block 408, the MSMS communication device may determine whether there are persistent page collisions among multiple subscriptions in the plurality of subscriptions. In an embodiment, the MSMS communication device may determine each of the plurality of subscriptions' start of their respective paging sessions based on their DRX cycle lengths.

If the MSMS communication device determines that there are persistent page collisions among multiple subscriptions in the plurality of subscriptions (i.e., determination block 408="No"), the MSMS communication device may continue performing in block 406 by monitoring the plurality of subscriptions for collisions.

If the MSMS communication device determines that there are persistent page collisions among multiple subscriptions in the plurality of subscriptions (i.e., determination block 408="Yes"), the MSMS communication device may select the reselecting subscriptions in block 1002. In an embodiment, the MSMS communication device may select a camped subscription to remain on its original cell while the remaining colliding subscriptions may be selected to be the reselecting subscriptions. The MSMS communication device may select the camped-on subscription, for example, based on the relative qualities of each colliding subscription's neighboring cells, and the subscription with the worst neighboring cells (e.g., worst signal strength or channel quality) may be selected to remain camped on its original cell.

In block 1006, the MSMS communication device may choose a reselecting subscription. The MSMS communication device may choose the reselecting subscription arbitrarily or based on various known selection techniques. In block 1008, the MSMS communication device may select a potential neighboring cell for the chosen reselecting subscription. In an embodiment, the MSMS communication device may select the neighboring cell with, for example, the best channel quality and signal strength. The MSMS communication device may also determine the page timing for the potential neighboring cell in block 1010. In an embodiment, as described above with reference to FIG. 9, the MSMS communication device may determine various characteristics about the page burst arrival times for the potential neighboring cell based on, for example, the CCCH_GROUP parameter and the PAGING_GROUP parameter.

In determination block 1012, the MSMS communication device may determine whether the page timing for the potential neighboring cell conflicts with another page timing of another subscription's cell, such as the camped subscription's cell. In an embodiment, the MSMS communication device may attempt to force the reselecting subscription to reselect to a neighboring cell that will avoid persistent page collisions as discussed above with reference to FIG. 9.

If the MSMS communication device determines that the page timing for the potential neighboring cell does conflict with another page timing of another subscription's cell (i.e., determination block 1012="Yes"), the MSMS communication device may determine whether there is another potential neighboring cell available in determination block 1014. If the MSMS communication device determines that there is not another potential neighboring cell available (i.e., determination block 1014="No"), the MSMS communication device may force the selected reselecting subscription to switch to the potential neighboring cell in block 1016. If the MSMS communication device determines that there is another potential neighboring cell available (i.e., determination block 1014="Yes"), the MSMS communication device may select the another neighboring cell for the reselecting subscription in block 1018. In an embodiment, the MSMS communication device may not select a previously selected potential neighboring cell. The MSMS communication device may continue determining the page timing for the different neighboring cell in block 1010.

If the MSMS communication device determines that the page timing for the potential neighboring cell does not conflict with the page timing of another subscription's cell (i.e., determination block 1012="No"), the MSMS communication device may force the reselecting subscription to reselect to the potential neighboring cell in block 1016.

The MSMS communication device may also determine whether there is another reselecting subscription in determination block 1020. In an embodiment, the MSMS communication device may choose each reselecting subscription until each reselecting subscription has been forced to reselect to a neighboring cell. If the MSMS communication device determines that there is not another reselecting subscription (i.e., determination block 1020="No"), the MSMS communication device may continue monitoring the plurality of subscriptions for collisions in block 406.

If the MSMS communication device determines that there is another reselecting subscription (i.e., determination block 1020="Yes"), the MSMS communication device may select another reselecting subscription in block 1022. The MSMS communication device may also continue selecting a potential neighboring cell for the another reselecting subscription in block 1008.

Figure 11:
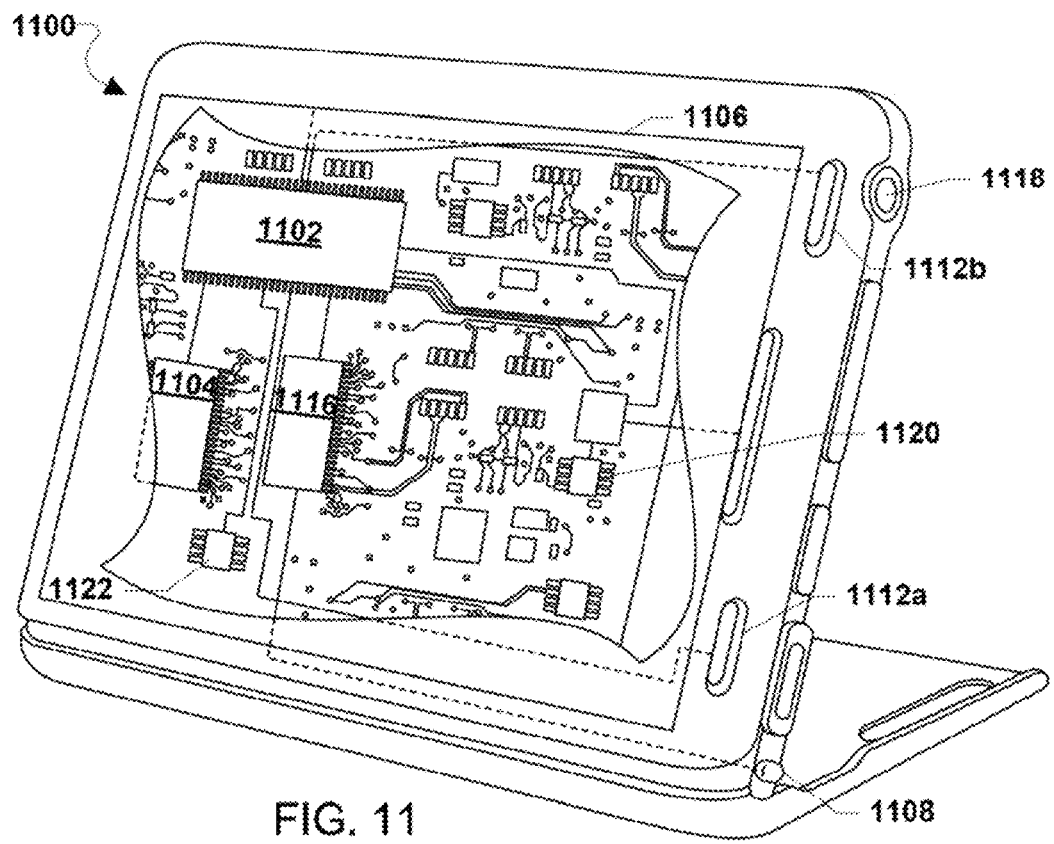
FIG. 11 is a block diagram of an example MSMS communication device according to an embodiment.

The various embodiments may be implemented in any of a variety of mobile communication devices, an example of which is illustrated in FIG. 11. For example, the mobile communication device 1100 may include a processor 1102 coupled to internal memory 1104. Internal memory 1104 may be volatile or non-volatile memory, and may also be secure and/or encrypted memory, or unsecure and/or unencrypted memory, or any combination thereof. The processor 1102 may also be coupled to a touch screen display 1106, such as a resistive-sensing touch screen, capacitive-sensing touch screen infrared sensing touch screen, or the like. Additionally, the display of the mobile communication device 1100 need not have touch screen capability. Additionally, the mobile communication device 1100 may have one or more antenna 1108 for sending and receiving electromagnetic radiation that may be connected to a wireless data link and/or cellular telephone transceiver 1116 coupled to the processor 1102. The mobile communication device 1100 may also include physical buttons 1112a and 1112b for receiving user inputs. The mobile communication device 1100 may also include a power button 1118 for turning the mobile communication device 1100 on and off. The mobile communication device 1100 may have a first SIM card 1120 and a second SIM card 1122 that utilize a cellular telephone transceiver 1116 and one or more antennae 1108 to connect to a first and a second mobile network, respectively. While not shown, the MSMS communication device may also have additional SIMs that utilize one or more cellular telephone transceivers to respectively connect to additional mobile networks.

Figure 12:
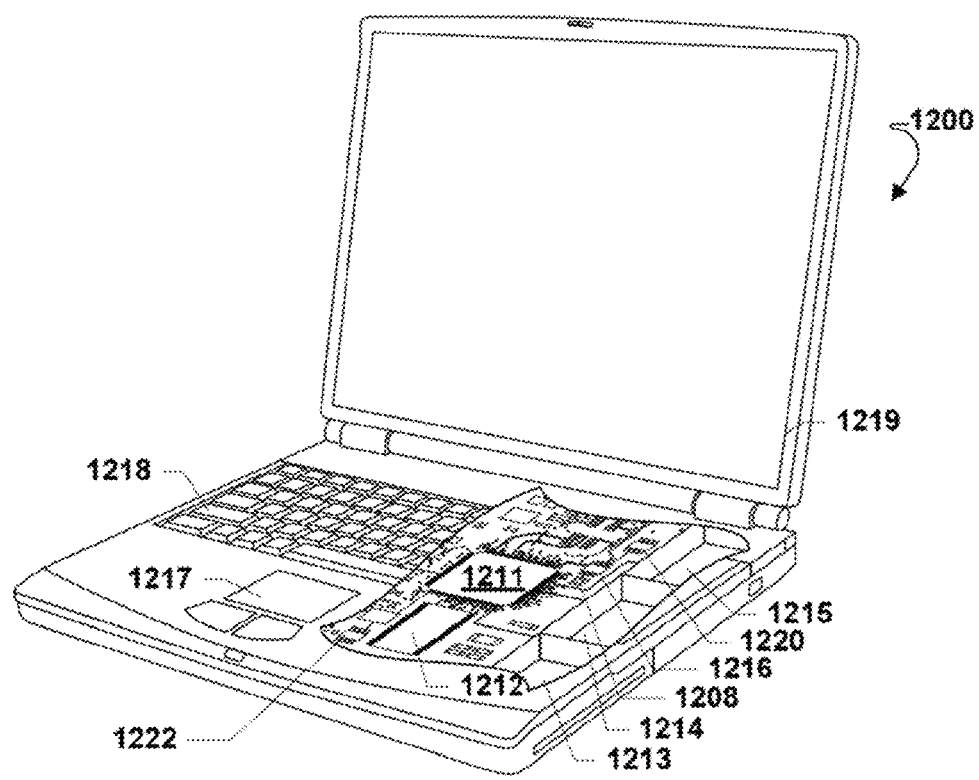
FIG. 12 is a block diagram of another example MSMS communication device according to an embodiment.

The various embodiments described above may also be implemented within a variety of mobile communication devices, such as a laptop computer 1200 illustrated in FIG. 12. Many laptop computers include a touchpad touch surface 1217 that serves as the computer's pointing device, and thus may receive drag, scroll, and flick gestures similar to those implemented on mobile computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be use in conjunction with the various embodiments. The computer 1200 may have a first SIM card 1220 and a second SIM card 1222 that utilize a cellular telephone transceiver 1216 and one or more antennae 1208 to connect to a first and a second mobile network, respectively. While not shown, the MSMS communication device may also have additional SIMs that utilize one or more cellular telephone transceivers to respectively connect to additional mobile networks.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing forced reselections for multiple colliding subscriptions on a multi-SIM-multi-standby communication device comprising a plurality of subscriptions, comprising:
   initially setting a reselection counter for each of the plurality of subscriptions;
   determining whether the reselection counter for a reselecting subscription in the multiple colliding subscriptions is greater than a reselection threshold when persistent collisions are detected among the multiple colliding subscriptions;
   forcing the reselecting subscription to perform reselection to a neighboring cell in response to determining that the reselection counter for the reselecting subscription is not greater than the reselection threshold;
   incrementing the reselection counter of the reselecting subscription after forcing the reselecting subscription to perform reselection; and
   implementing a forced reselection strategy after forcing the reselecting subscription to perform reselection.

2. The method of claim 1, wherein implementing a forced reselection strategy comprises:
   determining whether a camped subscription in the multiple colliding subscriptions has reselected to another cell; and
   forcing the reselecting subscription to fall back to its original cell in response to determining that the camped subscription has reselected to the another cell.

3. The method of claim 1, wherein implementing a forced reselection strategy comprises:
   determining whether the reselecting subscription has set up a call on the neighboring cell;
   determining whether the reselecting subscription's original cell is preferable to the neighboring cell in response to determining that the reselecting subscription has set up the call on the neighboring cell; and
   forcing the reselecting subscription to fall back to its original cell in response to determining that its original cell is preferable to the neighboring cell.

4. The method of claim 3, further comprising sending fabricated measurement reports to the neighboring cell to facilitate handoff of the call to the reselecting subscription's original cell.

5. The method of claim 3, further comprising:
   determining whether the call is over; and
   forcing the reselecting subscription to reselect back to the neighboring cell in response to determining that the call is over.

6. The method of claim 1, wherein implementing a forced reselection strategy comprises:
   performing page collision arbitration for the reselecting subscription in response to determining that the reselection counter for the reselecting subscription is greater than the reselection threshold.

7. The method of claim 1, further comprising resetting the reselection counter for each of the plurality of subscriptions when persistent collisions are not detected among the multiple colliding subscriptions.

8. The method of claim 1, further comprising:
   determining whether a camped subscription has reselected to another cell;
   forcing the reselecting subscription to fall back to its original cell in response to determining that the camped subscription has reselected to the another cell; and
   resetting the reselection counter for each of the plurality of subscriptions after forcing the reselecting subscription to fall back to its original cell.

9. The method of claim 1, further comprising forcing the reselecting subscription to fall back to its original cell in response to determining that the reselection counter for the reselecting subscription is greater than the reselection threshold.

10. The method of claim 1, wherein forcing the reselecting subscription to perform reselection comprises:
    selecting a potential neighboring cell for the reselecting subscription;
    determining a page timing for the potential neighboring cell;
    determining whether the page timing of the potential neighboring cell conflicts with another cell's page timing, wherein a subscription in the plurality of subscriptions is currently camped on the another cell; and
    forcing the reselecting subscription to reselect to the potential neighboring cell in response to determining that the page timing of the potential neighboring cell does not conflict with the another cell's page timing.

11. The method of claim 10, further comprising:
    determining whether another potential neighboring cell is available for the reselecting subscription in response to determining that the page timing of the potential neighboring cell does conflict with the another cell's page timing;

selecting the another potential neighboring cell in response to determining that the another potential neighboring cell is available; and forcing the reselecting subscription to reselect to the potential neighboring cell in response to determining that the another potential neighboring cell is not available.

12. The method of claim 10, wherein determining a page timing for the potential neighboring cell comprises:
   starting a timer;
   receiving information over a broadcast control channel;
   determining a common control channel group (CCCH_GROUP) parameter based on the received information;
   determining a paging group (PAGING_GROUP) parameter based on the received information; and
   determining an arrival time of page bursts on the potential neighboring cell based the CCCH_GROUP parameter, the PAGING_GROUP parameter, and the timer.

13. A multi-SIM-multi-standby communication device, comprising:
   means for initially setting a reselection counter for each of a plurality of subscriptions;
   means for determining whether the reselection counter for a reselecting subscription in multiple colliding subscriptions in a plurality of subscriptions operating on the multi-SIM-multi-standby communication device is greater than a reselection threshold when persistent collisions are detected among the multiple colliding subscriptions;
   means for forcing the reselecting subscription to perform reselection to a neighboring cell in response to determining that the reselection counter for the reselecting subscription is not greater than the reselection threshold;
   means for incrementing the reselection counter of the reselecting subscription after forcing the reselecting subscription to perform reselection; and
   means for implementing a forced reselection strategy after forcing the reselecting subscription to perform reselection.

14. The multi-SIM-multi-standby communication device of claim 13, wherein means for implementing a forced reselection strategy comprises:
   means for determining whether a camped subscription in the multiple colliding subscriptions has reselected to another cell; and
   means for forcing the reselecting subscription to fall back to its original cell in response to determining that the camped subscription has reselected to the another cell.

15. The multi-SIM-multi-standby communication device of claim 13, wherein means for implementing a forced reselection strategy comprises:
   means for determining whether the reselecting subscription has set up a call on the neighboring cell;
   means for determining whether the reselecting subscription's original cell is preferable to the neighboring cell in response to determining that the reselecting subscription has set up the call on the neighboring cell; and
   means for forcing the reselecting subscription to fall back to its original cell in response to determining that its original cell is preferable to the neighboring cell.

16. The multi-SIM-multi-standby communication device of claim 15, further comprising means for sending fabricated measurement reports to the neighboring cell to facilitate handoff of the call to the reselecting subscription's original cell.

17. The multi-SIM-multi-standby communication device of claim 15, further comprising:
   means for determining whether the call is over; and
   means for forcing the reselecting subscription to reselect back to the neighboring cell in response to determining that the call is over.

18. The multi-SIM-multi-standby communication device of claim 13, wherein means for implementing a forced reselection strategy comprises:
   means for performing page collision arbitration for the reselecting subscription in response to determining that the reselection counter for the reselecting subscription is greater than the reselection threshold.

19. The multi-SIM-multi-standby communication device of claim 13, further comprising means for resetting the reselection counter for each of the plurality of subscriptions when persistent collisions are not detected among the multiple colliding subscriptions.

20. The multi-SIM-multi-standby communication device of claim 13, further comprising:
   means for determining whether a camped subscription has reselected to another cell;
   means for forcing the reselecting subscription to fall back to its original cell in response to determining that the camped subscription has reselected to the another cell; and
   means for resetting the reselection counter for each of the plurality of subscriptions after forcing the reselecting subscription to fall back to its original cell.

21. The multi-SIM-multi-standby communication device of claim 13, further comprising means for forcing the reselecting subscription to fall back to its original cell in response to determining that the reselection counter for the reselecting subscription is greater than the reselection threshold.

22. The multi-SIM-multi-standby communication device of claim 13, wherein means for forcing the reselecting subscription to perform reselection comprises:
   means for selecting a potential neighboring cell for the reselecting subscription;
   means for determining a page timing for the potential neighboring cell;
   means for determining whether the page timing of the potential neighboring cell conflicts with another cell's page timing, wherein a subscription in the plurality of subscriptions is currently camped on the another cell; and
   means for forcing the reselecting subscription to reselect to the potential neighboring cell in response to determining that the page timing of the potential neighboring cell does not conflict with the another cell's page timing.

23. The multi-SIM-multi-standby communication device of claim 22, further comprising:
   means for determining whether another potential neighboring cell is available for the reselecting subscription in response to determining that the page timing of the potential neighboring cell does conflict with the another cell's page timing;
   means for selecting the another potential neighboring cell in response to determining that the another potential neighboring cell is available; and
   means for forcing the reselecting subscription to reselect to the potential neighboring cell in response to determining that the another potential neighboring cell is not available.

24. The multi-SIM-multi-standby communication device of claim 22, wherein means for determining a page timing for the potential neighboring cell comprises:

means for starting a timer;
means for receiving information over a broadcast control channel;
means for determining a common control channel group (CCCH_GROUP) parameter based on the received information;
means for determining a paging group (PAGING_GROUP) parameter based on the received information; and
means for determining an arrival time of page bursts on the potential neighboring cell based the CCCH_GROUP parameter, the PAGING_GROUP parameter, and the timer.

25. A multi-SIM-multi-standby communication device, comprising:
a processor configured with processor-executable instructions to:
initially set a reselection counter for each of a plurality of subscriptions;
determine whether the reselection counter for a reselecting subscription in multiple colliding subscriptions in a plurality of subscriptions operating on the multi-SIM-multi-standby communication device is greater than a reselection threshold when persistent collisions are detected among the multiple colliding subscriptions;
force the reselecting subscription to perform reselection to a neighboring cell in response to determining that the reselection counter for the reselecting subscription is not greater than the reselection threshold;
increment the reselection counter of the reselecting subscription after forcing the reselecting subscription to perform reselection; and
implement a forced reselection strategy after forcing the reselecting subscription to perform reselection.

26. The multi-SIM-multi-standby communication device of claim 25, wherein the processor is configured with processor-executable instructions such that implementing a forced reselection strategy comprises:
determining whether a camped subscription in the multiple colliding subscriptions has reselected to another cell; and
forcing the reselecting subscription to fall back to its original cell in response to determining that the camped subscription has reselected to the another cell.

27. The multi-SIM-multi-standby communication device of claim 25, wherein the processor is configured with processor-executable instructions such that implementing a forced reselection strategy comprises:
determining whether the reselecting subscription has set up a call on the neighboring cell;
determining whether the reselecting subscription's original cell is preferable to the neighboring cell in response to determining that the reselecting subscription has set up the call on the neighboring cell; and
forcing the reselecting subscription to fall back to its original cell in response to determining that its original cell is preferable to the neighboring cell.

28. The multi-SIM-multi-standby communication device of claim 27, wherein the processor is further configured with processor-executable instructions to send fabricated measurement reports to the neighboring cell to facilitate handoff of the call to the reselecting subscription's original cell.

29. The multi-SIM-multi-standby communication device of claim 27, wherein the processor is further configured with processor-executable instructions to:
determine whether the call is over; and
force the reselecting subscription to reselect back to the neighboring cell in response to determining that the call is over.

30. The multi-SIM-multi-standby communication device of claim 25, wherein the processor is configured with processor-executable instructions such that implementing a forced reselection strategy comprises:
performing page collision arbitration for the reselecting subscription in response to determining that the reselection counter for the reselecting subscription is greater than the reselection threshold.

31. The multi-SIM-multi-standby communication device of claim 25, wherein the processor is further configured with processor-executable instructions to reset the reselection counter for each of the plurality of subscriptions when persistent collisions are not detected among the multiple colliding subscriptions.

32. The multi-SIM-multi-standby communication device of claim 25, wherein the processor is further configured with processor-executable instructions to:
determine whether a camped subscription has reselected to another cell;
force the reselecting subscription to fall back to its original cell in response to determining that the camped subscription has reselected to the another cell; and
reset the reselection counter for each of the plurality of subscriptions after forcing the reselecting subscription to fall back to its original cell.

33. The multi-SIM-multi-standby communication device of claim 25, wherein the processor is further configured with processor-executable instructions to force the reselecting subscription to fall back to its original cell in response to determining that the reselection counter for the reselecting subscription is greater than the reselection threshold.

34. The multi-SIM-multi-standby communication device of claim 25, wherein the processor is configured with processor-executable instructions such that forcing the reselecting subscription to perform reselection comprises:
selecting a potential neighboring cell for the reselecting subscription;
determining a page timing for the potential neighboring cell;
determining whether the page timing of the potential neighboring cell conflicts with another cell's page timing, wherein a subscription in the plurality of subscriptions is currently camped on the another cell; and
forcing the reselecting subscription to reselect to the potential neighboring cell in response to determining that the page timing of the potential neighboring cell does not conflict with the another cell's page timing.

35. The multi-SIM-multi-standby communication device of claim 34, wherein the processor is further configured with processor-executable instructions to:
determine whether another potential neighboring cell is available for the reselecting subscription in response to determining that the page timing of the potential neighboring cell does conflict with the another cell's page timing;
select the another potential neighboring cell in response to determining that the another potential neighboring cell is available; and force the reselecting subscription to reselect to the potential neighboring cell in response to determining that the another potential neighboring cell is not available.

36. The multi-SIM-multi-standby communication device of claim 34, wherein the processor is configured with processor-executable instructions such that determining a page timing for the potential neighboring cell comprises:
   starting a timer;
   receiving information over a broadcast control channel;
   determining a common control channel group (CCCH_GROUP) parameter based on the received information;
   determining a paging group (PAGING_GROUP) parameter based on the received information; and
   determining an arrival time of page bursts on the potential neighboring cell based the CCCH_GROUP parameter, the PAGING_GROUP parameter, and the timer.

37. A non-transitory processor-readable storage medium having stored thereon processor-executable software instructions configured to cause a processor of a multi-SIM-multi-standby communication device to perform operations comprising:
   initially setting a reselection counter for each of a plurality of subscriptions;
   determining whether the reselection counter for a reselecting subscription in multiple colliding subscriptions in a plurality of subscriptions operating on the multi-SIM-multi-standby communication device is greater than a reselection threshold when persistent collisions are detected among the multiple colliding subscriptions;
   forcing the reselecting subscription to perform reselection to a neighboring cell in response to determining that the reselection counter for the reselecting subscription is not greater than the reselection threshold;
   incrementing the reselection counter of the reselecting subscription after forcing the reselecting subscription to perform reselection; and
   implementing a forced reselection strategy after forcing the reselecting subscription to perform reselection.

38. The non-transitory processor-readable storage medium of claim 37, wherein the stored processor-executable software instructions are configured to cause a processor of a multi-SIM-multi-standby communication device to perform operations such that implementing a forced reselection strategy comprises:
   determining whether a camped subscription in the multiple colliding subscriptions has reselected to another cell; and
   forcing the reselecting subscription to fall back to its original cell in response to determining that the camped subscription has reselected to the another cell.

39. The non-transitory processor-readable storage medium of claim 37, wherein the stored processor-executable software instructions are configured to cause a processor of a multi-SIM-multi-standby communication device to perform operations such that implementing a forced reselection strategy comprises:
   determining whether the reselecting subscription has set up a call on the neighboring cell;
   determining whether the reselecting subscription's original cell is preferable to the neighboring cell in response to determining that the reselecting subscription has set up the call on the neighboring cell; and
   forcing the reselecting subscription to fall back to its original cell in response to determining that its original cell is preferable to the neighboring cell.

40. The non-transitory processor-readable storage medium of claim 39, wherein the stored processor-executable software instructions are configured to cause a processor of a multi-SIM-multi-standby communication device to perform operations further comprising sending fabricated measurement reports to the neighboring cell to facilitate handoff of the call to the reselecting subscription's original cell.

41. The non-transitory processor-readable storage medium of claim 39, wherein the stored processor-executable software instructions are configured to cause a processor of a multi-SIM-multi-standby communication device to perform operations further comprising:
   determining whether the call is over; and
   forcing the reselecting subscription to reselect back to the neighboring cell in response to determining that the call is over.

42. The non-transitory processor-readable storage medium of claim 37, wherein the stored processor-executable software instructions are configured to cause a processor of a multi-SIM-multi-standby communication device to perform operations such that implementing a forced reselection strategy comprises:
   performing page collision arbitration for the reselecting subscription in response to determining that the reselection counter for the reselecting subscription is greater than the reselection threshold.

43. The non-transitory processor-readable storage medium of claim 37, wherein the stored processor-executable software instructions are configured to cause a processor of a multi-SIM-multi-standby communication device to perform operations further comprising resetting the reselection counter for each of the plurality of subscriptions when persistent collisions are not detected among the multiple colliding subscriptions.

44. The non-transitory processor-readable storage medium of claim 37, wherein the stored processor-executable software instructions are configured to cause a processor of a multi-SIM-multi-standby communication device to perform operations further comprising:
   determining whether a camped subscription has reselected to another cell;
   forcing the reselecting subscription to fall back to its original cell in response to determining that the camped subscription has reselected to the another cell; and
   resetting the reselection counter for each of the plurality of subscriptions after forcing the reselecting subscription to fall back to its original cell.

45. The non-transitory processor-readable storage medium of claim 37, wherein the stored processor-executable software instructions are configured to cause a processor of a multi-SIM-multi-standby communication device to perform operations further comprising forcing the reselecting subscription to fall back to its original cell in response to determining that the reselection counter for the reselecting subscription is greater than the reselection threshold.

46. The non-transitory processor-readable storage medium of claim 37, wherein the stored processor-executable software instructions are configured to cause a processor of a multi-SIM-multi-standby communication device to perform operations such that forcing the reselecting subscription to perform reselection comprises:
   selecting a potential neighboring cell for the reselecting subscription;
   determining a page timing for the potential neighboring cell;
   determining whether the page timing of the potential neighboring cell conflicts with another cell's page timing, wherein a subscription in the plurality of subscriptions is currently camped on the another cell; and forcing the reselecting subscription to reselect to the potential neighboring cell in response to determining that the page timing of the potential neighboring cell does not conflict with the another cell's page timing.

47. The non-transitory processor-readable storage medium of claim 46, wherein the stored processor-executable software instructions are configured to cause a processor of a multi-SIM-multi-standby communication device to perform operations such that further comprising:

determining whether another potential neighboring cell is available for the reselecting subscription in response to determining that the page timing of the potential neighboring cell does conflict with the another cell's page timing;

selecting the another potential neighboring cell in response to determining that the another potential neighboring cell is available; and forcing the reselecting subscription to reselect to the potential neighboring cell in response to determining that the another potential neighboring cell is not available.

48. The non-transitory processor-readable storage medium of claim 46, wherein the stored processor-executable software instructions are configured to cause a processor of a multi-SIM-multi-standby communication device to perform operations such that determining a page timing for the potential neighboring cell comprises:

starting a timer;
receiving information over a broadcast control channel;
determining a common control channel group (CCCH_GROUP) parameter based on the received information;
determining a paging group (PAGING_GROUP) parameter based on the received information; and
determining an arrival time of page bursts on the potential neighboring cell based the CCCH_GROUP parameter, the PAGING_GROUP parameter, and the timer.

* * * * *